(12) United States Patent
Siddiqui et al.

(10) Patent No.: US 12,248,454 B2
(45) Date of Patent: Mar. 11, 2025

(54) SCALABLE INDEX TUNING WITH INDEX FILTERING AND INDEX COST MODELS

(71) Applicant: Microsoft Technology Licensing, LLC, Redmond, WA (US)

(72) Inventors: Tarique Ashraf Siddiqui, Redmond, WA (US); Vivek Ravindranath Narasayya, Redmond, WA (US); Surajit Chaudhuri, Kirkland, WA (US); Wentao Wu, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/897,930

(22) Filed: Aug. 29, 2022

(65) Prior Publication Data

US 2023/0385261 A1   Nov. 30, 2023

Related U.S. Application Data

(60) Provisional application No. 63/345,307, filed on May 24, 2022.

(51) Int. Cl.
  *G06F 16/22*    (2019.01)
  *G06F 11/34*    (2006.01)
  *G06F 16/2453*  (2019.01)

(52) U.S. Cl.
  CPC ...... *G06F 16/2272* (2019.01); *G06F 11/3419* (2013.01); *G06F 16/24542* (2019.01)

(58) Field of Classification Search
  CPC ............. G06F 16/2272; G06F 11/3419; G06F 16/24542; G06F 16/22
  See application file for complete search history.

(56) References Cited

U.S. PATENT DOCUMENTS

| 7,272,589 B1 * | 9/2007 | Guay ............... G06F 16/22 |
| | | 707/999.005 |
| 10,452,650 B1 * | 10/2019 | Monaharan ....... G06F 16/2445 |

(Continued)

FOREIGN PATENT DOCUMENTS

EP    4227821 A1 *   8/2023    ......... G06F 16/2272

OTHER PUBLICATIONS

Ma, et al., "Active Learning for ML Enhanced Database Systems", In Proceedings of the ACM SIGMOD International Conference on Management of Data, Jun. 14, 2020, pp. 175-191.

(Continued)

*Primary Examiner* — Maher N Algibhah
(74) *Attorney, Agent, or Firm* — Novo TechIP International PLLC

(57) ABSTRACT

A method of training an index filter for an index tuning system includes receiving a plurality of different workloads and a plurality of different databases, each database including different tables and each workload including a plurality of queries; generating labeled training by making optimizer calls to a query optimizer using query and index configuration pairs from the plurality of databases and the plurality of workloads; training an index filter model to identify signals in the labeled training data, the signals being indicative of a potential performance improvement associated with using an index configuration for a given query; training the index filter model to learn rules over the signals for identifying spurious indexes; and storing the index filter model in a memory.

20 Claims, 13 Drawing Sheets

(56) References Cited

U.S. PATENT DOCUMENTS

| | | | | |
|---|---|---|---|---|
| 2018/0322154 | A1* | 11/2018 | Bahry | G06F 16/2462 |
| 2019/0303475 | A1* | 10/2019 | Jindal | G06F 16/24545 |
| 2020/0219028 | A1* | 7/2020 | Papaemmanouil | |
| | | | | G06Q 10/06375 |
| 2022/0414099 | A1* | 12/2022 | Dutt | G06F 16/24542 |

OTHER PUBLICATIONS

"International Search Report and Written Opinion Issued in PCT Application No. PCT/US23/019021", Mailed Date: Jul. 7, 2023, 11 Pages.

Valavala, et al., "Automatic Database Index Tuning Using Machine Learning", In Proceedings of 6th International Conference on Inventive Computation Technologies (ICICT), Jan. 20, 2021, pp. 523-530.

Wu, et al., "Dynamic Index Construction with Deep Reinforcement Learning", In Journal of Data Science and Engineering, May 6, 2022, pp. 87-101.

"sklearn.neural_network.MLPRegressor", Retrieved from: https://web.archive.org/web/20220617013217/https://scikit-learn.org/stable/modules/generated/sklearn.neural_network.MLPRegressor.html, Jun. 17, 2022, 6 Pages.

"Statistics", Retrieved from: https://docs.microsoft.com/en-us/sql/relational-databases/statistics/statistics?view=sql-server-ver15, Dec. 1, 2021, 26 Pages.

Basu, et al., "Cost-Model Oblivious Database Tuning with Reinforcement Learning", In Database and Expert Systems Applications, Sep. 4, 2015, 30 Pages.

Bruno, et al., "Automatic physical database tuning: a relaxation-based approach", In Proceedings of the ACM SIGMOD international conference on Management of data, Jun. 14, 2005, pp. 227-238.

Bruno, et al., "Physical design refinement: The 'merge-reduce' approach", In Journal of ACM Transactions on Database Systems, vol. 32, Issue 4, Nov. 1, 2007, 41 Pages.

Chaudhuri, et al., "An Efficient Cost-Driven Index Selection Tool for Microsoft SQL Server", In Proceedings of the 23rd International Conference on Very Large Data Bases, Aug. 25, 1997, pp. 146-155.

Chaudhuri, et al., "Anytime Algorithm of Database Tuning Advisor for Microsoft SQL Server", Retrieved from: https://www.microsoft.com/en-us/research/uploads/prod/2020/06/Anytime-Algorithm-of-Database-Tuning-Advisor-for-Microsoft-SQL-Server.pdf, Jun. 2020, 10 Pages.

Chaudhuri, et al., "AutoAdmin 'What-if' Index Analysis Utility", In Journal of ACM SIGMOD Record, vol. 27, Issue 2, Jun. 1, 1998, pp. 367-378.

Chaudhuri, et al., "Compressing SQL workloads", In Proceedings of the ACM SIGMOD international conference on Management of data, Jun. 4, 2002, pp. 488-499.

Chaudhuri, et al., "Index merging", In Proceedings of 15th International Conference on Data Engineering, Mar. 23, 1999, 8 Pages.

Chaudhuri, et al., "To Tune or not to Tune? A Lightweight Physical Design Alerter", In Proceedings of the 32nd International conference on Very large data bases, Sep. 12, 2006, pp. 499-510.

Chauhdhri, et al., "Index Selection for Databases: A Hardness Study and a Principled Heuristic Solution", In journal of IEEE Transactions on Knowledge and Data Engineering, vol. 16, Issue 11, Nov. 2004, pp. 1313-1323.

Comer, Douglas, "The Difficulty of Optimum Index Selection", In Journal of ACM Transactions on Database Systems, vol. 3, No. 4, Dec. 1978, pp. 440-445.

Das, et al., "Automatically Indexing Millions of Databases in Microsoft Azure SQL Database", In Proceedings of the International Conference on Management of Data, Jun. 30, 2019, pp. 666-679.

Dash, et al., "Efficient use of the query optimizer for automated database design", In Proceedings of the 33rd International conference on Very large data bases, Sep. 23, 2007, pp. 1093-1104.

Deep, et al., "Comprehensive and Efficient Workload Compression", In Proceedings of the VLDB Endowment, vol. 14, Nov. 11, 2020, pp. 418-430.

Ding, et al., "AI Meets AI: Leveraging Query Executions to Improve Index Recommendations", In Proceedings of the International Conference on Management of Data, Jun. 30, 2019, pp. 1241-1258.

Ding, et al., "DSB Benchmark", Retrieved from: https://github.com/microsoft/dsb, May 11, 2022, 5 Pages.

Dutt, et al., "Selectivity Estimation for Range Predicates Using Lightweight Models", In Proceedings of the VLDB Endowment, vol. 12, Issue 9, May 1, 2019, pp. 1044-1057.

Finkelstein, et al., "Physical Database Design for Relational Databases", In Journal of ACM Transactions on Database Systems, vol. 13, Issue 1, Mar. 1, 1988, pp. 91-128.

Ghanayem, et al., "dta utility", Retrieved from: https://docs.microsoft.com/en-us/sql/tools/dta/dta-utility?view=sql-server-ver15, May 12, 2021, 14 Pages.

Ghosh, et al., "Plan selection based on query clustering", In Proceedings of the 28th international conference on Very Large Data Bases, Aug. 20, 2002, 12 Pages.

Hulgeri, et al., "Parametric query optimization for linear and piecewise linear cost functions", In Proceedings of the 28th international conference on Very Large Data Bases, Aug. 20, 2002, 12 Pages.

Jindal, et al., "Peregrine: Workload Optimization for Cloud Query Engines", In Proceedings of the ACM Symposium on Cloud Computing, Nov. 20, 2019, pp. 416-427.

Kossmann, et al., "Magic mirror in my hand, which is the best in the land? An Experimental Evaluation of Index Selection Algorithms", In Proceedings of the VLDB Endowment, vol. 13, Issue 12, Jul. 1, 2020, pp. 2382-2395.

Lan, et al., "An Index Advisor Using Deep Reinforcement Learning", In Proceedings of the 29th ACM International Conference on Information & Knowledge Management, Oct. 19, 2020, pp. 2105-2108.

Perera, et al., "DBA bandits: Self-driving index tuning under ad-hoc, analytical workloads with safety guarantees", In Repository of arXiv:2010.09208v2, Oct. 20, 2020, 12 Pages.

Reddy, et al., "Analyzing plan diagrams of database query optimizers", In Proceedings of the 31st conference on Very large data bases, Aug. 30, 2005, 13 Pages.

Sadri, et al., "Online Index Selection Using Deep Reinforcement Learning for a Cluster Database", In Proceedings of IEEE 36th International Conference on Data Engineering Workshops (ICDEW), Apr. 20, 2020, pp. 158-161.

Sharma, et al., "The Case for Automatic Database Administration using Deep Reinforcement Learning", In Journal of Computing Research Repository, Jan. 2018, 9 Pages.

Siddiqui, et al., "DISTILL: Low-Overhead Data-Driven Techniques for Filtering and Costing Indexes for Scalable Index Tuning", In Proceedings of the VLDB Endowment, vol. 14, Issue 10, Sep. 5, 2022, 14 Pages.

Valentin, et al., "DB2 Advisor: An Optimizer Smart Enough to Recommend Its Own Indexes", In Proceedings of 16th International Conference on Data Engineering, Feb. 29, 2000, 10 Pages.

Wang, et al., "FLAML: A Fast and Lightweight AutoML Library", In Fourth Conference on Machine Learning and Systems, May 19, 2021, 14 Pages.

* cited by examiner

| Logical Operators | Physical Operators |
|---|---|
| Scan | Table Scan, Index Scan, Index Seek, Clustered Index Scan, Clustered Index Seek |
| Filter | Filter, Bitmap |
| Join | Nested-Loop, Hash Match, Merge Join |
| Group By/Aggregation | Hash Match, Stream Aggregate, Sort |
| Sort | Sort |

FIG. 4A

| S1 | selection |
|---|---|
| S2 | join |
| S3 | selection → join |
| S4 | join → selection |
| S5 | order-by → selection → join |
| S6 | group-by → selection → join |
| S7 | order-by → join → selection |
| S8 | group-by → selection → join |

FIG. 4B

| Name | #Queries | #Templates | #Tables |
|---|---|---|---|
| TPC-H ($sf=10$) | 220 | 22 | 8 |
| TPC-DS ($sf=10$) | 910 | 91 | 24 |
| DSB [1] ($sf=10$) | 520 | 52 | 24 |
| Real-M (26GB) | 160 | 32 | 474 |

Summary of workloads

FIG. 4C

```
SELECT LCol1, AVG(LCol2)
FROM   LineItem L, Order O
WHERE  LCol1 = OCol3 AND OCol2 < 10
GROUP BY LCol1
         SQL query
```

FIG. 5A

| Predicate | Selectivity |
|---|---|
| LCol1 = OCol3 | 0.50 |
| OCol2 < 10 | 0.10 | selectivity estimates

FIG. 5B

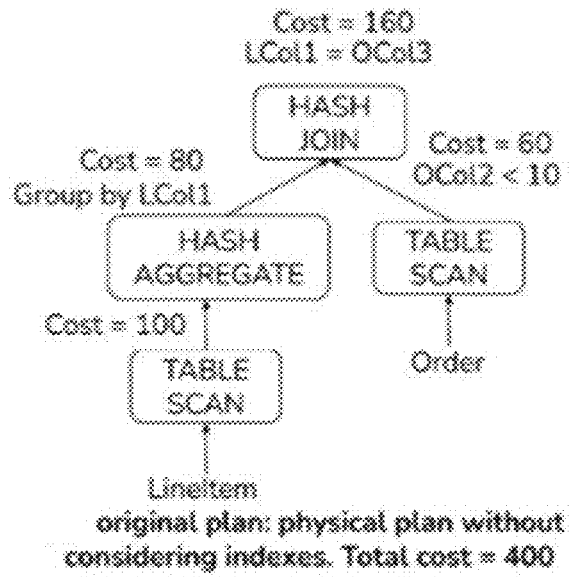

original plan: physical plan without considering indexes. Total cost = 400

FIG. 5C

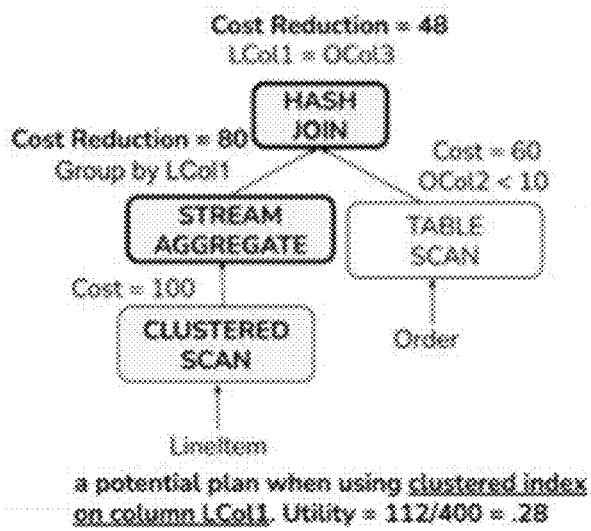

a potential plan when using clustered index on column LCol1. Utility = 112/400 = .28

FIG. 5D

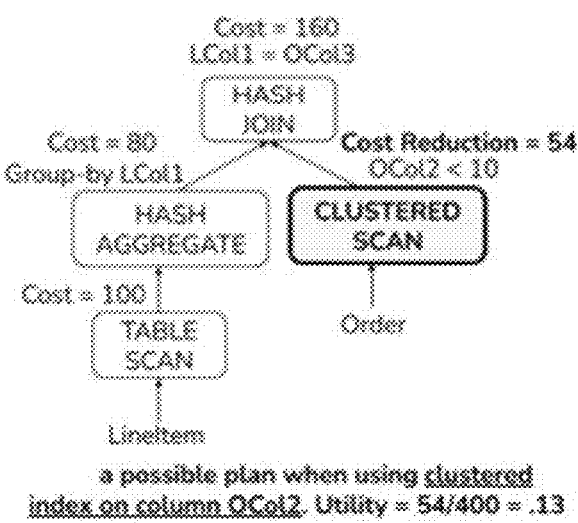

a possible plan when using clustered index on column OCol2. Utility = 54/400 = .13

FIG. 5E

Algorithm 1: Training Index Cost Model for a given query template

Input: A set of query instances belonging to the same template: $Q$; a set of candidate indexes: $I$; desired error threshold $\epsilon$, training sample size for the first iteration: $\alpha$, training sample size to add to subsequent iterations: $\beta$, hard threshold to stop training: $H$, total (query, candidate index) pairs for the template: $T$

Output: A Index Cost Model or NULL (when an accurate Index Cost Model cannot be trained)

Cluster queries $Q$ based on selectivities ;
Cluster indexes $I$ based on shapes ;
$S \leftarrow$ Sample $\alpha$ (query, configuration) pairs using the process described in §5.2;
$M \leftarrow$ Train a regression model using $S$ ;
while *error of $M \geq \epsilon$* do
    if *size of $S$ $H$* then
        return *NULL*;
    end
    $N \leftarrow$ Sample $\beta$ (query,configuration) pairs using the process described in §5.2;
    $S \leftarrow$ Add $N$ training samples to previous $S$ samples ;
    $M \leftarrow$ Re-train $M$ using $S$ samples ;
end
return $M$;

FIG. 6

Improvement

Tuning time

|  | TPC-H | TPC-DS | DSB | Real-M |
|---|---|---|---|---|
| Total (query, syntactic index) pairs | 3284 | 11351 | 8832 | 7350 |
| Total configurations explored by all optimizer calls | 18534 | 87334 | 45294 | 23568 |
| Total (query, syntactic index) pairs after Index Filter | 1832 | 6842 | 4042 | 3562 |
| Total configurations explored by DISTILL | 8231 | 34204 | 20565 | 9445 |
| Total optimizer calls made by DISTILL | 964 | 4021 | 2459 | 1754 |
| Total Index Cost Models | 20 | 86 | 49 | 29 |
| Average training instance size for each Index Cost Models | 18 | 25 | 32 | 41 |
| Average training time for each Index Cost Models (excluding optimizer calls) | 4s | 5s | 7s | 8s |
| Average inference time for Index Filters | 8 ms | 10ms | 10ms | 10ms |
| Average inference time for Index Cost Models | 5ms | 5ms | 5m | 5ms |

Analysis of Index Filter and Index Cost Models

FIG. 9A

| Workload | w/o utility | w/o shape | w/o operators | w/o optimizer behaviour |
|---|---|---|---|---|
| TPC-H | .60 | .69 | .68 | .75 |
| TPC-DS | .30 | .50 | .53 | .74 |
| DSB | .35 | .40 | .59 | .71 |
| Real-M | .49 | .65 | .57 | .77 |

Sensitivity of features for Index Filter measured using F-1 score while turning off each category of features

FIG. 9B

| Name | #Optimizer Calls | Improvement | Tuning Time (mins) |
|---|---|---|---|
| TPC-H | 1739 | 75% | 31 |
| TPC-DS | 1324 | 63% | 748 |
| DSB [1] | 8394 | 63% | 395 |
| Real-M | 5272 | 54% | 184 |

Cost derivation using atomic configurations

FIG. 9C

Clustered Sampling

Unclustered Sampling

Impact of error threshold

Impact of $\alpha$

Impact of $\beta$

Pruning after selecting each index using greedy algorithm

Impact of seed indexes

SCALABLE INDEX TUNING WITH INDEX FILTERING AND INDEX COST MODELS

CROSS-REFERENCE TO RELATED APPLICATION

This application claims the benefit of priority from U.S. Patent Application Ser. No. 63/345,307, filed on May 24, 2022, and entitled "Scalable Index Tuning with Index Filtering and Index Cost Models." The entire content of the above-referenced application is incorporated herein by reference.

BACKGROUND

A database includes a set of tables of data along with information about relations between the tables. Tables represent relations over the data. Each table includes a set of records of data stored in one or more data fields. The records of a table are also referred to as rows, and the data fields of records in a table are also referred to as columns. A database management system (DBMS) manages the storage of the data in the database and processes data manipulation statements or queries. Such statements and queries are processed, for example, to retrieve, update, insert, and/or delete data in a database. Queries are defined by a query language supported by the DBMS. For example, users can write queries and run them against a database to retrieve desired information from the database. In general, to retrieve requested information, a database server can retrieve an appropriate table from storage, load it into memory, and search row by row for the desired information. However, given the substantial size of most databases, searching for data in this manner is often time-consuming and inefficient.

To enhance performance in processing queries, a DBMS uses indexes to help access data in a database more efficiently. The number of possible indexes over a database can be very large and can significantly increase the memory requirements, including storage requirements, for the database, as well as the cost associated with keeping the indexes up to date as data is updated, inserted, and deleted. Also, many of the possible indexes may provide no or minimal performance advantage considering the data in the database, the organization of the data in the database, and the usage of the database as represented by a workload of queries executed against the database. Typical database systems therefore use only a subset of possible indexes for accessing databases.

Index tuning is part of a DBMS for selecting and creating indexes. The goal of index tuning is to improve the performance of the database, e.g., by reducing the query processing time. Given a workload (e.g., a set of SQL statements that execute against a database) and a set of constraints (e.g., a storage budget), index tuning tools recommend a set of appropriate indexes to use to improve the performance of the database. Given an input workload, index tuning tools first generate candidate indexes for each query and then search for the best configuration among the candidate indexes via configuration enumeration tool. During enumeration, what-if optimizer calls are made to estimate the cost of a given query-index configuration pair without building the indexes. A what-if call is at least as expensive as a regular optimizer call, consuming a significant (over 70%) fraction of the tuning time. Thus, making a large number of what-if calls increases the time taken for tuning, and increases the CPU and memory burden on the DBMS. The latter is particularly important in cloud databases that offer self-tuning capabilities. For index tuning tools to be scalable, it is therefore crucial to employ techniques for identifying when what-if calls can be avoided without affecting the quality of recommended indexes.

The larger the workload, the more time it takes for tuning and the more resources required to implement and maintain the tuning. Therefore, one challenge in implementing index tuning tools is scaling these tools to a large workload. The scalability challenge is further amplified today in today's cloud computing environment where the tuning tools need to explore a large number of queries and potential index configurations, which further adds to the resource and cost overheads of the cloud computing environments.

Different approaches have been developed to address the salability problem of index tuning. One approach is enumerating configurations in reduced search spaces. However, this approach still requires one what-if call for every (query, configuration) pair which can still place a burden on the system. This approach may also adversely impact the quality of recommended indexes because in some cases the indexes not considered may offer better results. Another approach is to use cost-derivation techniques to reduce optimizer calls for a subset of (query, index configuration) pairs. Although such techniques help reduce the tuning time, the number of optimizer calls may still be large and therefore may still require a significant amount of tuning time. Furthermore, rules applied for cost derivation may not effectively capture the interactions between multiple indexes, thereby degrading the quality of recommended indexes especially over complex workloads.

What is needed are systems and methods for index tuning that are capable of reducing the number of optimizer calls required to determine a recommended index configuration for a workload without adversely impacting the improvement provided by the recommended index so that index tuning can be scaled to larger and/or more complex databases.

SUMMARY

In one general aspect, the instant disclosure presents a method of training an index filter for an index tuning system. The method includes receiving a plurality of different workloads and a plurality of different databases, each database including different tables and each workload including a plurality of queries; generating labeled training data by making optimizer calls to a query optimizer of a database using query and index configuration pairs from the plurality of databases and the plurality of workloads using an index tuning system; training an index filter model to identify signals in the labeled training data, the signals being indicative of a potential performance improvement associated with using an index configuration for a given query; learning rules over the signals for identifying spurious indexes using the index training model; and storing the index filter model in a memory.

In yet another general aspect, the instant disclosure presents a database management system including a processor and a memory in communication with the processor. The memory includes executable instructions that, when executed by the processor, cause the data processing system to perform functions of: receiving a workload including a plurality of queries to be run against a database; identifying syntactically relevant indexes based on the queries in the workload using an index tuning system; making optimizer calls to a query optimizer of a database with a database management system (DBMS) using query and index configuration pairs to estimate costs for the query and index configuration pairs as part of an index tuning process; identifying queries having a same template using the index tuning system; selecting a set of the query and index configuration pairs to use as training instances; training an index cost model for the group using the training instances while the index tuning process is being performed, the index cost model being trained to estimate a cost for the queries having the same template; and once a target accuracy for the index cost model has been achieved, using the index cost model to estimate costs for the queries having the same template as part of the index tuning process without having to make optimizer calls.

In a further general aspect, the instant disclosure presents a method for tuning a database index. The method includes receiving a workload including a plurality of queries to be run against a database; identifying syntactically relevant indexes using the queries in the workload; filtering the syntactically relevant indexes using an index filter model, the index filter model being a workload-agnostic filtering model trained to identify signals in query-configuration pairs based on the syntactically relevant indexes and to apply rules to the identified signals to detect spurious indexes; making optimizer calls using query-configuration pairs based on the filtered syntactically relevant indexes to estimate costs for the query-configuration pairs based on the filtered syntactically relevant index models as part of an index tuning process; identifying queries from the filtered syntactically relevant index models having a same template; selecting a diverse set of the query-configuration pairs to use as training instances from the query-configuration pairs based on the filtered syntactically relevant index models; training an index cost model for the group using the training instances while the index tuning process is being performed, the index cost model being trained to estimate a cost for the queries having the same template; and once a target accuracy for the index cost model has been achieved, using the index cost model to estimate costs for the query-configuration pairs based on the filtered syntactically relevant index models without having to make optimizer calls.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4A depicts a table of logical operators and their corresponding physical operators.

FIG. 4B depicts a table showing rules for combining indexable columns to construct indexes.

FIG. 4C depicts a table showing number of queries, number of templates and number of tables for two benchmark and two real workloads.

FIGS. 5A-5E show an example of estimating the potential improvement for an index.

FIG. 6 depicts an algorithm showing how the cost model may be trained for each query template.

FIG. 9A depicts a table showing the analysis of Index Filter and Index Cost Models.

FIG. 9B depicts a table showing the sensitivity of features (i.e., signals) for Index Filter measured using F-1 score while turning off each category of features.

FIG. 9C depicts a table showing the cost derivation using atomic configurations.

DETAILED DESCRIPTION

Figure 1A:
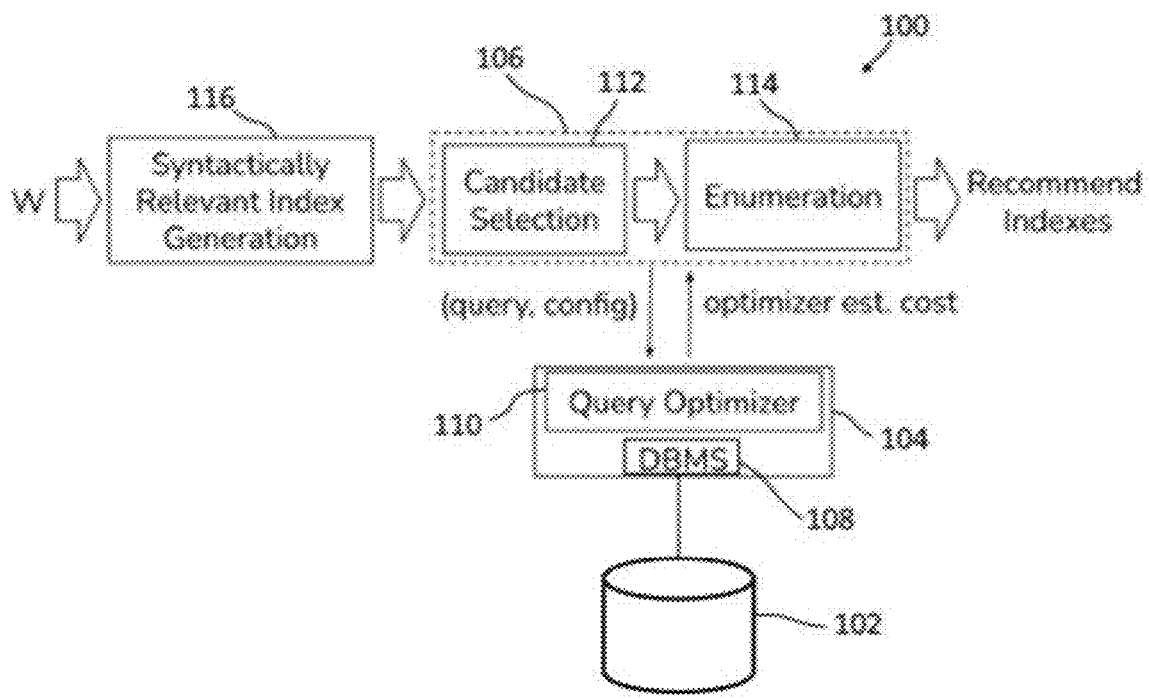
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As discussed above, given an input workload, index tuning tools first generate candidate indexes for each query and then search for the best index configuration among the candidate indexes via configuration enumeration. During enumeration, the tools make what-if optimizer calls to estimate the cost of a given query-index configuration pair without building the indexes. Making what-if optimizer calls is time consuming and resource intensive. As database systems become larger and more complex and have increased workloads, the time required for index tuning may become prohibitive. For index tuning tools to be scalable, it is therefore crucial to employ techniques for identifying when what-if calls can be avoided without affecting the quality of recommended indexes.

To address these technical problems and more, in an example, this description provides technical solutions in the form of systems and methods directed to using machine learning algorithms to learn rules for filtering indexes and estimating costs which may be applied to reduce the number of optimizer calls during index tuning so that tuning time may be reduced without impacting the quality of the results. It has been observed that a large percentage (e.g., 50-70%) of the indexes for a given database are spurious, i.e., given a query and an index, the optimizer either does not use the index or uses it with minimal gain (e.g., <5% improvement in cost) as shown in FIG. 1B. FIG. 1B shows the percentage of improvement in cost (y-axis) vs fractions of query-index configuration pairs (x-axis) for four synthetic and real workloads (i.e., TPC-H and TPC-DS which are synthetic workloads, and DSB and Real-M which are real workloads). The systems and methods described herein use a workload-agnostic filtering model, referred to herein as an Index Filter. The Index Filter is trained offline to capture certain features, referred to herein as signals, of indexes, queries, and/or optimizers that may be indicative of potential improvement and/or reduction in cost that may be realized when using a given index with a query. Rules are then learned over these signals that may be applied during the index tuning to remove spurious indexes from consideration without having to make an optimizer call.

For example, the original execution plan for a query (i.e., the plan generated with existing physical design structures and without considering the index) can be probed to estimate the potential for improvement in the cost of the query due to a given index so that indexes offering little to no improvement in cost may be identified as spurious. If a join or sort operation is already efficient due to an extensive filtering from earlier operators, adding an index that optimizes subsequent operations is less beneficial and results in minimal improvement in cost. Similarly, if a filter column is not selective, it can be assumed that an index with such a column as the leading key column may offer minimal improvement in cost. Furthermore, in many cases, the shape of the query plan (e.g., ordering of physical operators within the original plan) as well as the size of table and types of existing indexes on the table to identify indexes which may not further improve the performance.

It has also been observed that many indexes explored during tuning have a high degree of similarity in terms of structure, e.g., have the same prefix of key columns and/or influence the same set of operators in the plan (as can be seen in the right side of the graph of FIG. 1B), which results in similar costs when these indexes are used for the same query. As a result, the number of unique costs is often much fewer than the number of index configurations explored during tuning. To leverage these characteristics, the systems and methods described herein are configured to identify and group similar queries and configurations. Index-specific cost models, referred to herein as Index Cost Models, are learned for each group separately which can be used to estimate costs for the respective groups without requiring to make optimizer calls with each index in the group. Since it is difficult to learn an offline model that can accurately predict the cost of an arbitrary (query, configuration) pair for a given database, let alone an unseen database, the Index Cost Models of the present disclosure are trained in-situ during tuning to learn rules for estimating costs for a group of similar indexes.

For efficient in-situ training during the tuning, a training procedure (with optimality guarantees) is provided that utilizes a small and diverse set of training instances sampled from (query, index) pairs selected by Index Filter to train the Index Cost Models. The training size is incrementally increased until the model error reduces within a small error threshold. For groups, where estimation error of models do not reduce quickly (i.e., within certain fraction of training instances), optimizer calls may be used for estimating costs for the indexes in these groups. Once trained, Index Cost Models are cached and used to estimate costs for at least some of the indexes in the groups of similar indexes so that optimizer calls for these indexes during enumeration may be avoided.

The technical solutions described herein address the difficulties associated with index tuning, especially for larger and more complex databases, by providing low-overhead techniques that can be leveraged by index tuning tools for reducing a large number of optimizer calls without making any changes to the tuning algorithm or to the query optimizer. Index tuning tools use rule-based techniques to generate a large number of syntactically-relevant indexes. However, a large proportion of such indexes are spurious and do not lead to a significant improvement in the performance of queries. The systems and methods of the present disclosure eliminate spurious indexes much earlier in the search by leveraging patterns and statistics in the workload, without making optimizer calls. Optimizer calls are further reduced using index-specific cost models that exploit the commonality across optimizer calls between similar query and configuration pairs in the workload. The techniques and methods described herein can greatly reduce the number of what-if optimizer calls without affecting the quality of recommended indexes. This in turn provides a significant reduction in the time required for index tuning without affecting the quality of recommended indexes.

Figure 1B:
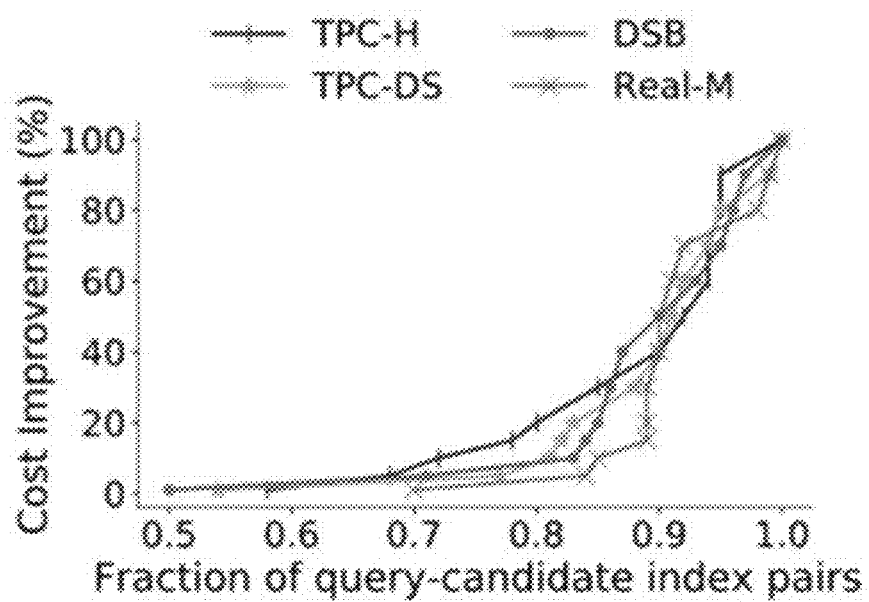
FIG. 1B shows a graph comparing cost improvement percentage and fraction of query-candidate index pairs.

Turning now to the drawings, FIG. 1A illustrates an example system 100, upon which aspects of this disclosure may be implemented. The system 100 includes a database 102, a database server 104, and an index tuning system 106. Database 102 comprises a set of tables of data along with information about relations between the tables. Tables represent relations over the data. Each table includes a set of records of data stored in one or more data fields. The records of a table are also referred to as rows, and the data fields of records in a table are also referred to as columns. Database server 104 includes a database management system (DBMS) 108 for processing queries, for example, to retrieve, insert, delete, and/or update data in database 102. DBMS 108 may support any suitable query language, such as Structured Query Language (SQL) for example, to define the queries that may be processed by DBMS 108.

DBMS 108 includes a query optimizer 110 for improving the performance in processing queries. The query optimizer 110 uses database indexes to determine the optimal execution plan for a given query. Indexes are structures used to quickly locate data without having to search every row in a database every time a database is accessed. An index may be based on one or more columns of a database table and includes pointers to the records pertaining to the columns are located. Given a set of available indexes, the query optimizer 110 is configured to process a query with respect to the available indexes to determine the execution plan for the query having the lowest cost. The cost may be a measure of the resources, such as CPU, I/O and memory required to execute the query, the amount of time required to execute the query, and/or based on other type of statistical information.

The index tuning system 106 is configured to perform index tuning for DBMS 108. To this end, Index tuning system 106 includes a candidate selection module 112, a configuration enumeration module 114, and a relevant index generator module 116. Index tuning system 106 is configured to receive as input a workload W and predefined constraints, such as maximum number of indexes allowed and storage budget. The workload W is a set of queries (e.g., SQL statements) to be executed against database. The relevant index generator module 116 is configured to parse the workload W to identify syntactically relevant indexes pertaining to the set of queries. For example, the relevant index generator module 116 may identify columns relevant to the queries, e.g., columns that are part of the filter and join predicates, or group-by and order-by clauses. The relevant index generator module 116 then generates syntactically-relevant indexes using the identified indexable columns by applying predefined rules.

Once the syntactically relevant indexes have been identified, the candidate selection module 112 is configured to identify the index configuration, i.e. the subset of one or more relevant indexes, that are used in the execution plan for each query. This may be performed by making what-if calls to the query optimizer for each query in the workload. As used herein, the term "what-if call" refers to a call to the optimizer that includes a query and an index configuration for the query to determine an optimal execution plan for the query based on the hypothetical index configuration. The index configuration for each query may then be combined to form a set of candidate indexes.

The configuration enumeration module 114 is configured to process the set of candidate indexes to determine a recommended index configuration, i.e., subset of the candidate indexes, for the DBMS that is capable of handling the entire workload as well as satisfying any constraints, such as number of indexes and/or storage budget, and that results in the most improvement in performance for the workload W. Since different subsets of the candidate indexes may be capable of handling the workload and that satisfies the constraints, configuration enumeration module 114 is configured to enumerate all the possible index configurations and to determine which index configuration results in the most improvement in performance. The index configuration that results in the most improvement in performance is then selected as the recommended index configuration for the workload W.

For example, consider an input workload W consisting of n queries (i.e., $W=\{q_1, q_2, \ldots q_n\}$) that needs to be processed to select a number k of candidate indexes for the recommended index configuration for the workload W. Let $C(q_i)$ be the optimizer-estimated cost of a query $q_i$ of workload W, which may be determined by the candidate selection module 112 and/or the configuration enumeration module 114. Let $C(W)$ be the optimizer-estimated cost for the entire workload W such that:

$$C(W)=\Sigma_{i=1}^{n}C(q_i).$$

Let I be a set of k candidate indexes selected as a possible index configuration for workload W. $C_I(q_i)$ would be the optimizer-estimated cost of query $q_i$ and $C_I(W)$ would be the optimizer-estimated cost for the entire workload W using the set of indexes I as the index configuration. Note that the cost of performing a query using a subset of the relevant indexes as the index configuration for the query is typically less than the cost of performing the query using all of the relevant indexes (e.g., $C_I(q_i) \leq C(q_i)$). The expected performance improvement of workload W using a subset of relevant indexes I is captured using the concept of "improvement," where improvement $\Delta$ is defined as the decrease in the cost of the workload W when using the subset of indexes in I, i.e., $\Delta=C(W)-C_I(W)$.

Based on this definition of improvement, the configuration enumeration module 114 is configured to determine the total cost of each possible index configuration for the candidate indexes and to select the index configuration having the lowest total cost as the recommended index configuration for the workload W. Determining the total cost of each possible index configuration may require making what-if calls to the query optimizer for each query in the workload for each possible index configuration.

The total number of what-if calls used to determine a recommended index configuration for a workload can be significant. A what-if call is at least as expensive as a regular optimizer call, consuming a significant fraction (e.g., over 70%) of the tuning time. Thus, as the number of what-if calls increases, the tuning time increases as well as the cost, e.g., the CPU and memory burden on the DBMS. The latter is particularly important in cloud databases that offer self-tuning capabilities.

Figure 2A:
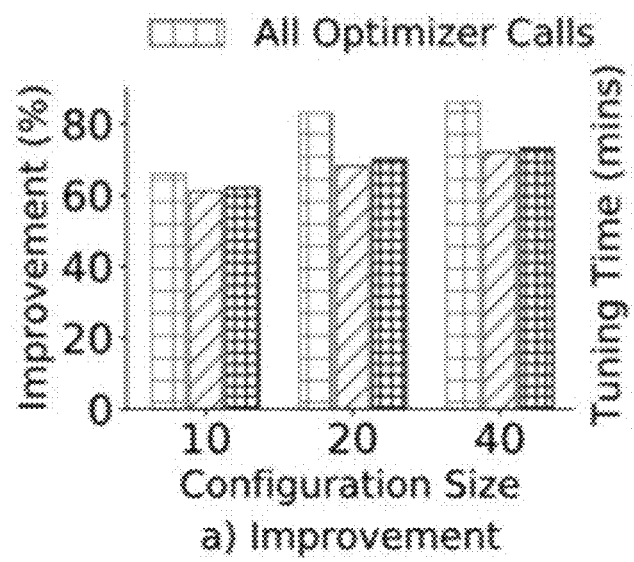
FIG. 2A shows a graph comparing configuration size and improvement percentage.
Figure 2B:
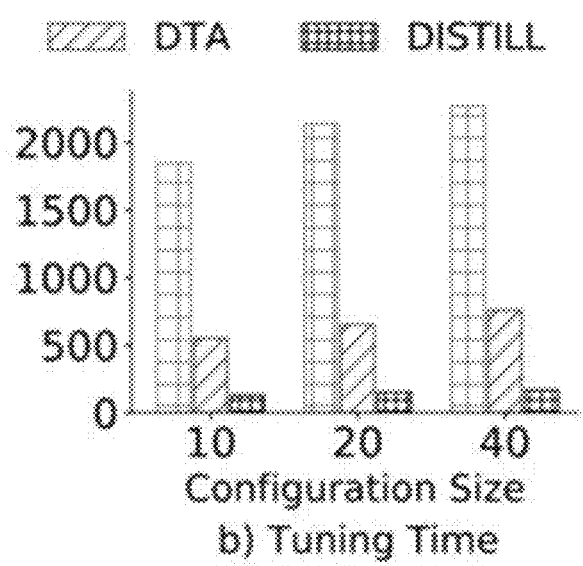
FIG. 2B shows a graph comparing configuration size and tuning time.

FIG. 2A shows a graph comparing the size of a workload (x-axis) to the tuning time for the workload (in milliseconds), and FIG. 2B shows a graph the number of queries in a workload to the number of index configurations required to be explored to determine a recommended index configuration. In the graph of FIG. 2A, the workload is a TPC-DS workload which is a frequently used benchmark to test database performance. As can be seen, the tuning time grows significantly as the size of the workload increases. This is primarily because, as shown in FIG. 2B, the space of index configurations (i.e., total number of configurations) to explore increases as the number of queries increase.

Workloads generated by cloud applications can be even larger and consist of more complex queries (e.g., in the order of hundreds of thousands of statements); and tuning of such workloads within reasonable amount of time is challenging. Furthermore, the process of tuning a large workload can impose significant overhead on the server being tuned since the physical design tool needs to potentially make many what-if calls to the query optimizer component. It may also affect the performance of the workload being concurrently served. While it may be possible to use a "B-instance" of a database (e.g., a synchronized copy) for index tuning, it comes with a high operational cost and is not practical at scale for service providers that host millions of databases. As a result, index tuning in practice is primarily performed on the database server, imposing a significant overhead in terms of time and resources reserved for database queries.

An object of the present disclosure is to reduce the tuning time with minimal degradation in the improvement of the workload. As discussed, optimizer calls consume most of the index tuning time, thereby posing a scalability challenge. Thus, to reduce tuning time, the systems and methods of the present disclosure are configured to replace a large proportion of optimizer calls with significantly more efficient techniques for filtering indexes and estimating query/configuration costs. No changes are made to the configuration enumeration (or search) component or the query optimizer component of index tuning. In embodiments, the classic greedy search algorithm is implemented to enumerate configurations, which is efficient and widely used. However, the systems and methods provided herein do not leverage any property of the greedy algorithm and hence can be used with any other search algorithm.

As discussed above, technical solutions provided by the present disclosure include trained machine learning models which are utilized to filter spurious indexes and estimate costs to reduce to reduce the number of optimize calls required to determine a recommended index configuration. Low-overhead techniques are used to train the models so that index filtering and cost estimation is faster than making what-if calls to the optimizer. To filter index spurious indexes, a workload-agnostic model, referred to as Index Filter, is trained offline to capture signals related to the structure and/or statistics pertaining to a query, index and/or optimizer and to learn rules on these signals which may be used to identify spurious indexes during tuning (explained in more detail below). The Index Filter is then used to remove the spurious indexes during tuning so that optimizer calls using the indexes may be avoided. To estimate costs of query/configuration pairs, indexes having a high degree of similarity in terms of structure, e.g., have the same prefix of key columns and/or influence the same set of operators in the plan, are grouped, and an index-specific cost models, referred to herein as Index Cost Models, are learned for each group of similar indexes. Index Cost Models are trained in-situ during tuning to learn rules for estimating costs for a group of similar indexes which are then applied during enumeration to estimate costs for indexes in the respective groups without requiring optimizer calls for each index in the group (explained in more detail below).

Figure 3:
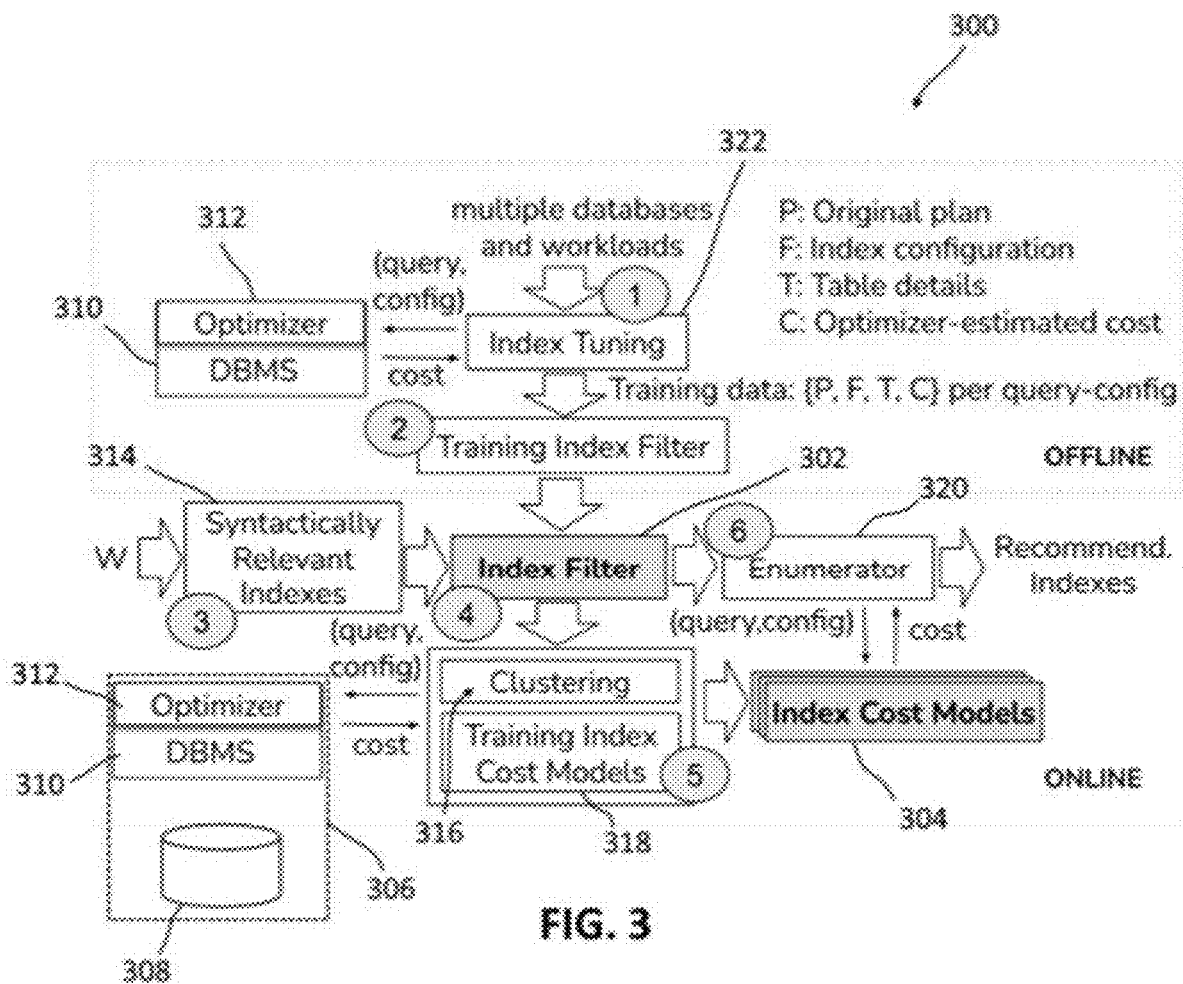
FIG. 3 depicts an example of an index tuning system in accordance with this disclosure.

FIG. 3 shows an example of an index tuning system 300 that utilizes an Index Filter 302 and Index Cost Models 304 in accordance with the present disclosure. Index tuning system 300 is configured to provide index tuning services for a database system 306. The database system 306 includes database 308 and a database server 310. Database 308 comprises a set of tables of data along with information about relations between the tables. Database server 310 includes a DBMS 310 for processing queries, for example, to retrieve, insert, delete, and/or update data in database. DBMS 310 includes a query optimizer 312 to improve performance in processing queries. The query optimizer 312 uses database indexes to determine the optimal execution plan for a given query.

Index tuning system 300 is configured to perform an index tuning process to determine a recommended index configuration to be used for performing a workload. To this end, index tuning system 300 includes a relevant index generator module 314, Index Filter 302, an index clustering component 316, Index Cost Models 304, an index cost model training component 318, and an enumeration component 320. In the index tuning system 300 receives as input a workload W and predefined constraints, such as maximum number of indexes allowed and storage budget. The workload W is a set of queries (e.g., SQL statements) to be executed against database 308. The relevant index generator module 314 parses the workload W to identify syntactically relevant indexes pertaining to the set of queries. For example, the relevant index generator module 314 may identify columns relevant to the queries, e.g., columns that are part of the filter and join predicates, or group-by and order-by clauses. The relevant index generator module 314 then generates a set of syntactically-relevant indexes using the identified indexable columns by applying predefined rules.

Once the syntactically relevant indexes have been identified, the Index Filter 302 is configured to identify spurious indexes and prune them from the set of relevant indexes. In embodiments, the Index Filter 302 is a workload-agnostic regression model that has been pretrained to capture signals related indicative of the performance improvement and/or cost reduction offered by using a given index with a particular query and to learn rules over these signals that may be applied to the syntactically relevant indexes to identify indexes that have a low potential for improving performance and/or reducing the cost of a query, i.e., spurious indexes, so that these indexes may be pruned. Examples of signals used to identify spurious indexes include potential improvement (also referred to as utility), shape of queries and indexes, physical operators, and optimizer behavior (each of which is explained in more detail below).

Indexes that have not been identified as spurious indexes are provided to the index cost model training component 318. Indexes that have not been identified as spurious indexes are also provided to the configuration enumeration component 320 as candidate indexes. The configuration enumeration component 320 is configured to process the set of candidate indexes to determine a recommended index configuration, i.e., subset of the candidate indexes, for the workload W that is capable of handling the entire workload as well as satisfying any constraints, such as number of indexes and/or storage budget, and that results in the most improvement in performance for the workload W.

Configuration enumerator may be configured to make calls to the Index Cost Models 304 to see if an Index Cost Model 304 is capable of providing an estimate of the cost for a given query-configuration pair. In some cases, Index Cost Models may not be capable of providing an estimate, in which case, the enumerator 320 may be configured to make an optimizer call with the query-configuration pair to determine the cost. Once the costs of the query-configuration pairs for each query have been determined, the configuration enumeration module 320 is configured to determine the total cost of each possible index configuration and to select the index configuration having the lowest total cost as the recommended index configuration for the workload.

As noted above, Index Filter 302 is configured capture signals indicative of the performance improvement and/or cost reduction that may be realized by using a particular index with a given query. Examples of signals used to identify spurious indexes include utility, shape of queries and indexes, physical operators, and optimizer behavior.

Potential improvement refers to the potential for improvement in the cost of the plan for a query due to the use of an index. When selecting an index for tuning, index tuners typically ignore the potential for improvement in cost of the plan due to the index. However, for many syntactically-relevant indexes, the costs of operators that these indexes improve is often significantly small compared to the overall cost of the plan. Thus, the potential improvement in performance offered by such indexes is small. The idea is to identify indexes which do not have a high potential for improvement in cost as spurious indexes so that those indexes may be removed from consideration without having to make what-if optimizer calls.

Since the goal is to identify spurious indexes instead of accurately estimating the new cost when using the index, simplifying assumptions may be made which help efficiently estimate the potential improvement. For example, it can be assumed that the potential for improvement for each syntactically-relevant index may be estimated using only the original execution plan of the query, i.e., the most efficient physical plan obtained by making an optimizer call for the query with existing physical design of the database. In many cases, the original plan may already be provided as part of the query logs or input workload without requiring an optimizer call to determine the plan. An extensive exploration of alternative plans would require optimizer calls (e.g., what-if calls) which are expensive and would negate the purpose of index filtering.

Another simplifying assumption that may be made is that an index has a high potential for improvement if it reduces the cost of physical operators in the original plan that have high costs relative to the rest of the operators in the plan, and vice-versa. The physical operators (also called relevant operators) are the physical operators associated with the following logical operators: scan, join, group-by, and sort (or order-by) as shown in the table of FIG. 4A.

An index can be considered as reducing the cost of an operator if the index satisfies one or both of the following properties: (1) the filtering property and (2) the interesting order property. An index satisfies the filtering property if the index enables the access of one or more tuples to be skipped during scan, filter, or join operations which reduces the costs of the operators associated with these operations. An interesting order is a tuple ordering specified by the columns in a query's join, group-by, or order by clause. An index satisfies the interesting order property if its key columns are sorted according to that interesting order which eliminates the need for the sort operator and the cost associated therewith.

To estimate the potential improvement of an index with respect to a query, the original execution plan for the query is traversed in a bottom-up manner to identify any physical operators whose cost can be reduced if the index was selected. An estimated cost reduction is then determined for each of the identified physical operators. The cost reduction for an operator is estimated using the cost C of the operator in the original plan.

If the index satisfies the filtering property (i.e., the index enables the access of one or more tuples by an operator to be skipped), the cost reduction for the operator is also based on the average selectivity (denoted by S) of key columns in the index that are used by the operator. In this case, the cost reduction is computed as $(1-S) \times C$, i.e., the reduction in cost is proportional to the fraction of tuples filtered using the index. In other words, the improvement is high if the cost of the operator is high and the selectivity of key columns is low. The join selectivity may be estimated as follows: Let O be the output cardinality of the join operator in the original plan, and L and R be the left and right input cardinalities to the join. The join selectivity may then be computed as $$J = \frac{O}{(L \times R)}.$$

Assuming that each of the left and right input cardinalities contribute equally to the join output, the selectivity of each of indexable columns is $\sqrt{J}$. The reduction in cost may then be estimated when adding an index to one of the inputs as $(1-\sqrt{J}) \times C$. While this estimation approach may be inaccurate when the index causes significant transformations in join ordering or operators, it is effective in identifying cases when the index does not cause any change (e.g., when J and C are already small) indicating that the index has a low potential for improvement and may be considered a spurious index.

When there is a sort operator in the plan that provides the same ordering of tuples as the index (i.e., the index has the interesting order property), the sort operator would not be required for that index so the reduction in cost associated with the sort operator is equivalent cost C of the sort operator C. If an index having the interesting order property includes a hash aggregate operator in the original plan, it is likely because the sorting required for stream aggregate operator is more expensive than the hash aggregate operator. Thus, if an index is already sorted properly for a stream aggregate operator, the cost reduction may be considered as equal to the cost of hash aggregate assuming that the cost of computing aggregations in a streaming manner is negligible compared to the cost of sorting for the stream aggregate.

Once the reduction in cost for each physical operator in an index has been estimated, the estimated cost reduction for the relevant operators may be summed to determine the estimated total cost reduction for the index. The utility of the index may then be determined by normalizing the total cost reduction for the index with respect to the total cost of the plan in order to give low importance to those indexes that may not lead to substantial improvement in the cost of a query, and vice versa.

An example of estimating the potential improvement for an index will now be described with reference to FIGS. 5A-5E. FIG. 5A shows an example SQL query, FIG. 5B shows the selectivity of predicates in the query, and FIG. 5C shows original plan of the query. The total cost of the original plan not considering indexes is 400. FIG. 5D shows the plan when using a clustered index on LCol1 on LineItem table. The original plan is traversed bottom-up to see if the table scan can be replaced with a clustered index scan. However, since there is no opportunity for filtering, the estimated reduction in cost for the clustered index scan is 0. Next, a check is made to see whether the hash aggregate operator in the original plan can be replaced with a stream aggregate since the index provides the ordering (e.g., interesting order property) on the group-by column. Since sorting is the most dominant operation while using stream aggregate, it is assumed the cost of stream aggregate is negligible compared to hash aggregate. Thus, the reduction in cost for the hash aggregate is 80 (i.e., the cost of the hash aggregate). Finally, the cost reduction of the hash join is considered. In this case, the index has the join key as the key column. As discussed above, the reduction in cost of a join due to adding an index on one of the join columns is computed as $(1-\sqrt{J})$ times the cost C of the join operator. Since the selectivity of the hash join is 0.50 and the cost of the hash join in the original plan is 160, the reduction in cost for the hash join may be computed as $(1-\sqrt{0.50}) \times 160$ which equals 48. Overall, the cost reduction for using the clustered index as shown in FIG. 5D is 112 (i.e., 48+80). The utility of using the clustered index corresponds to the total cost reduction divided by the total cost of the original plan (112/400) which is 0.28 in this case.

FIG. 5E shows the plan when using a clustered index on OCol2 on the 'Order' table. The plan of FIG. 5E is traversed bottom-up to see if the table scan can be replaced with a clustered index scan. In this case, the cost of the scan is reduced by a fraction proportional to the selectivity of the predicates, i.e., 54. The index in FIG. 5E does not have any operators other than the scan operator so the total cost reduction for the index is 54. Thus, the utility is 0.13 (i.e., 54/400).

Utility may be one of the most influential signals in identifying spurious indexes. That said, in some cases, utility by itself may not be sufficient to identify spurious indexes especially when the physical plan generated due to the index is significantly different from the original plan. Thus, other signals may be used in conjunction with utility to identify spurious indexes.

Another signal that may be captured and processed in determining whether indexes are spurious or not is index shapes and query shapes. In many cases, optimizers apply transformations rules (e.g., aggregate pushdown) that can impact the effectiveness of an index. More generally, query optimizers push more selective operations or operations that reduce intermediate data size down in the plan which in turn helps reduce the cost of upstream operators. Hence, building an index that can improve the performance of such lower-level operations is typically more beneficial than building an index that affects the performance of upstream operators. As an example, a large majority (>70%) of syntactically-relevant indexes with order-by or group-by columns as leading key columns are spurious. For many such cases, the downstream operators (i.e., operators below the group-by or order-by) such as filter or join operators are highly selective. However, in some cases, when the optimizer pushes an aggregate operation below the join, an index that satisfies the ordering property required for the aggregate may be more beneficial.

To capture such optimizations, the sequence of logical operators (i.e., scan/filter, join, aggregate and sort) is extracted for each table in the original plan in a bottom to top order. This sequence is referred to as the shape of the query. For instance, the shape of the sub-query on Lineitem table in FIG. 5C is scan→aggregate→join where the arrow "→" depicts the sequence in which tuples are processed. Similarly, the shape of subquery on Order table is scan→join. If the same operation occurs twice in a sequence, only the first occurrence of the operation is captured to avoid creating a large number of possible shapes. The shapes of the index are also extracted using the ordering of key columns in the index. Index tuning tools already use rules to combine indexable columns to construct indexes. For instance, the table in FIG. 4B shows a set of rules similar to the ones used by tools such as DTA. Thus, the shape of an index may be captured via the rule that is used for generating the index. In general, the more similar the index shape and subquery shapes are to each other, the higher the impact of an index. Note that an index can have more than one shape if the ordering of key columns satisfies different orderings of operations, e.g., when the same column is used across multiple operations. In the feature vector for learning regression model, each possible shape for a subquery or an index is represented via a feature.

Another signal that may be captured and analyzed to determine whether an index is spurious or not is the list of physical operators used in an index (e.g., the physical operators listed in the table of FIG. 4A). Values are assigned to the operators corresponding to the relevance of operator to the index. For example, if the operator is not relevant to the index, the value of the operator may be set to 0. If the operator is relevant, the value of the operators may be set using the statistics of the key columns used in the index. For example, if the physical operator is a filter, scan, or join operator, the value of the operator is assigned to correspond to the average selectivity of the key columns in the index that are used by the operator. If the physical operator is grouping or sort, the value of the operator is assigned to correspond to the average density of the key columns in the index. Density is a function of the number of unique values of the column(s), which impacts the cost of grouping and sort operations. It was found that the physical operator signals interact with shape-based signals of indexes and queries to improve the accuracy of identifying spurious indexes.

Other properties may also be considered as signals, such as the behavior of the query optimizer. For example, in some cases, the optimizer may not select more than certain number of indexes per table, or the optimizer may not build an index on smaller tables (e.g., Nation table in TPC-H) consisting of fewer pages than a specific threshold. Therefore, properties, such as the number of pages, the number of clustered indexes already present, the number of non-clustered indexes already present, and whether a scan or filter operation uses a bitmap, may also be captured to help determine whether indexes are spurious.

Referring again to FIG. 3, the Index Filter 302 is a workload-agnostic regression model that is trained to learn rules over the signals using a large corpus of query-configuration pairs generated from multiple databases. The model is trained offline using multiple databases and workloads, capturing a total of about 75 features. In implementations, an index tuning component 322 is configured to generate labeled training data by making optimizer calls using the databases and workloads, such as the workloads listed in the table of FIG. 4C which consist of a maximum of 170 k query-configuration pairs and their optimizer estimated costs. The training takes less than 5 minutes for a tree-based ensemble models while about 20 minutes for neural network models (only using CPU). The inference time for tree-based ensemble models is about 10 ms (about 1.5 to 2 orders of magnitude faster than optimizer calls) while for MLP-based models, it is in order of 100s of milliseconds.

Given an original plan for a query and an index, the Index Filter 302 is trained to predict how likely the index will lead to a change in cost of the plan. Log-transformed labels and mean square error are used as the loss function. In embodiments, the Index Filter 302 may be configured to prune indexes with a predicted value less than a predefined threshold. Since query optimizers can often have a small variance in estimated costs across multiple invocations even when the index is not used, a cost change is considered as significant if it is above a threshold $\alpha$. In embodiments, a threshold of 5% is used for a low false negative rate, although higher thresholds may be used (e.g., 20%). Thus, in embodiments, the Index Filter 302 may be configured to prune indexes with a predicted improvement value ≤0.05.

An alternative formulation is to learn a classifier $\alpha$ that predicts whether or not the plan or cost will change significantly when a particular index is used. However, for such a model, a change in the value of $\alpha$ requires retraining, which can be costly. Another issue is less flexibility in controlling the false positive and false negative rates since a high $\alpha$ leads to high false-positive rate and low false-positive rate while a low a leads to low false-positive rate and high false-positive rate.

To generate the features (i.e. signals), the original plan of the query is probed using the index to capture the signals discussed above. The featurization described herein differs from prior work on plan featurization in that each plan is featurized using the index as context, since only parts of the plan that may be influenced by the index are utilized. This in turn results in much fewer features, since often only a small set of operators are affected. Given these features, multiple machine learning (ML) models were experimented with including linear models, decision trees, ensembles of trees, and multi-layer perceptron (MLP) neural networks. Considering both inference time and model accuracy, tree-based ensemble models may be preferred.

Despite pruning, the number of optimizer calls during the tuning may still be large. In particular, if m is the number of queries in the input workload, n is the number of candidate indexes, and k is the maximum number of desired indexes, the number of configurations enumerated during the search may be O(mnk) (i.e., the greedy search algorithm). In order to further reduce the number of optimizer calls, Index Cost Models 304 are used to estimate costs that would otherwise require optimizer calls. Given a query and an index configuration, an Index Cost Model 304 is learned that returns the estimated cost of the query when using the index configuration. One Index Cost Model 304 is learned for each set of query instances with the same template. Two queries have the same template if they only differ in the parameter bindings. Since all query instances for a given Index Cost Model 304 have the same structure, only parameters and configurations are used for featurization. Furthermore, features are constructed in a schema-agnostic manner that helps minimize the number of features and captures similarity across similar indexes. For instance, different indexable columns with similar selectivity and affecting the same set of operators may have a similar set of feature values.

For each parameter in the query instance, a selectively of the parameter is estimated. Each column in an index configuration is considered and a feature depicting the index type is constructed, such as whether the column is a key column, whether the column is a key column, the type of operator among {scan, join, order-by, group-by}, the highest position of a column across any index in the configuration if it is a key column (this helps avoid combinatorial explosion in the number of features while still capturing the importance of a column), and the sort order of the column. Similar to the physical operator signals for Index Filter 302, the feature value is set to the selectivity if the indexable column influences a filter or join operation, and to the density of the column if it influences group-by, and to the actual order of column if it is part of order-by. A pass is made on all query instances of the template to collect all features.

Consider the query in FIG. 5A and a configuration consisting of three indexes {I1, I2, I3} where I1=[Unclustered: key=LCol1:asc], I2=[unclustered: key=OCol3,OCol2:asc], and I3=[unclustered: key=OCol2:asc]. The following features may be created:

Selectivity of OCol2<10
for column LCol1, we create the following three features: unclustered:key:scan:1:asc, unclustered:key:group-by: 1:asc, unclustered:key:join:1:asc. The number 1 indicates that LCol1 is at position 1 (i.e., the leading column) among the key columns for at least one index in the configuration.
for column OCol3, unclustered:key:join:1:asc
for column OCol1, unclustered:key:join:1:asc To evaluate the accuracy, the geometric mean of q-error may be used as the accuracy metric, measured as max (est/act, act/est) which is equivalent to minimizing the mean-squared error of the log-transformed labels. As with the Index Filter 302, tree-based ensemble models have been found to lead to sufficiently high accuracy. Since we learn one model for each template, reasonably good performance can be achieved using only 5 trees with depth of 6 each, where each inference call takes less than 5 milliseconds, including the inter-process communication. This is significantly faster than an optimizer call, which takes 100s of milliseconds.

One of the challenges for Index Cost Models is minimizing the amount of training instances (i.e., optimizer calls) used for learning. While a large number of training instances is better for improving accuracy, it increases model construction cost and the tuning time. On the other hand, training with too few examples compromises model accuracy and the quality of recommended indexes. To address this, two techniques may be utilized. First, the training instances may be diversified by further clustering query instances as well as indexes (discussed in more detail below). Second, an iterative approach may be used that incrementally increases the amount of training instances, until we achieve the target accuracy. The questions that need to be answered are: (1) how to sample queries and configurations for training; and (2) how to ensure that the models are not under-trained or how to ensure that models are overtrained by using many more samples than needed for training. FIG. 6 depicts an algorithm (i.e., Algorithm 1) that shows how the cost model may be trained for each query template.

To select dissimilar queries and configurations for training, clustering is applied. First, queries instances are clustered into $\sqrt{n}$ (a threshold typically used in compression algorithms for SQL workloads) number of clusters where n is the number of instances using Euclidean distance between the vector of parameter selectivities. Similarly, indexes may be clustered based on their shapes (index shapes are discussed above).

A training instance corresponds to a query-configuration pair and its optimizer-estimated cost. The same process is followed for sampling. First, a query cluster is sampled and a query instance is randomly picked from the sampled cluster. Next, the size of the configuration in a range from 1 to 4 is sampled. Let the sampled size be s. It has been observed that a configuration size >4 has negligible impact on improving the accuracy of the model and hence the maximum size of a configuration may be limited to 4. Next, given s, s clusters of candidate indexes are sampled and a candidate index is randomly picked from each cluster. Clusters are sampled without replacement. However, once all the clusters have been covered, the clusters are added back for re-sampling. A what-if call is the made to estimate the cost of the sampled query-configuration pair.

The Index Cost Models are incrementally trained over multiple iterations. In the first iteration, the training is started with a size a of training instances, and then in each of the subsequent iterations a number training instances is added. In each iteration, ¾ of the sampled instances are used for training the model, and ¼ of the sampled instances are used for validation. Given an error threshold ϵ, if the geometric mean of q-error over the validation set is less than ϵ, a model may be considered trained; otherwise, the next iteration is performed. Overall, more than 60% of Index Cost Models can be trained using less than 20% of the query-candidate index pairs. Setting α and β in a range of 5% to 15% of query-candidate index pairs has been found to result in a reasonable trade-off between model accuracy and training time, typically requiring 2 or 3 iterations. In addition, a hard-stop threshold H may be used to set the maximum size of training instance (by default ~50% of the total number of query-candidate index pairs for a given template) to avoid further training of cost models that do not converge quickly. For such templates (<10% in evaluated workloads), what-if calls may be used to determine the cost estimate. Any optimizer calls made for training templates may be stored in a cache and reused during enumeration.

To analyze iterative training, let $C_1(s)$ be the cost of generating s training examples, and let $C_2(s)$ be the cost of training an ML model with the s examples. In this problem, generating a training example requires making a what-if call to the query optimizer with the given query and index configuration. As a result, $C_1(s)=r \cdot C_2(s)$ where $r \gg 1$. Moreover, both $C_1(s)$ and $C_2(s)$ are proportional to the sample size s.

Let S* be the optimal amount of training examples required to achieve the same prediction accuracy as that given by the iterative training algorithm. An implicit assumption here is that more training examples will not worsen the prediction accuracy, which is a general assumption in learning theory. The optimal cost $C_{opt}$ is then the cost of generating these S* examples plus the cost of training an ML model with these S* examples. That is, $$C_{opt}=C_1(S^*)+C_2(S^*)=(r+1)*C_2(S^*)$$

Now consider the total cost C of the iterative training algorithm. The amount of training examples used in each iteration is $\alpha$, $\alpha+\beta$, alpha+$2\beta$, etc. Let z be the smallest integer such that $\alpha+2\beta \geq S^*$. By definition, this corresponds to $$A+(z-1)B<S^*$$

Assume $z \leq r$. Since $\eta=\beta/\alpha$, it follows that $$C < \left(\frac{2r+1}{r+1}\right) \cdot \left(1+\frac{\beta}{\alpha}\right) \cdot C_{opt} < 2 \cdot \left(1+\frac{\beta}{\alpha}\right) \cdot C_{opt}.$$

On the other hand, if $r \gg z$, which is the common case in practice (i.e., the number of iterations is much less than r given that a what-if call is very expensive compared to the amortized training cost per example), then $C<(1+\beta/\alpha) \cdot C_{opt}$, which improves the optimality guarantee by a factor of 2.

While the techniques described herein do not leverage any properties of the greedy algorithm, and can be used with any arbitrary enumeration algorithm, it has been observed that further optimizations may be made for the greedy algorithm. Specifically, by default, the Index Filter is used with the original plan to only filter syntactically-relevant indexes before performing the enumeration step. However, for an algorithm (e.g., greedy) that incrementally selects the indexes in a configuration, the Index Filter can be used to further prune candidate indexes that may not lead to significant improvement in performance given the already selected indexes. In experiments, it has been observed that this optimization further reduces the optimizer call between 10% to 15% across workloads.

In some cases, index tuners can create hypothetical indexes for all relevant indexes and make one optimizer call to get the indexes (called seed indexes) selected in the most optimal plan for each query. While there may be additional indexes that may be useful to the query (but may not be selected in the most optimal plan), the selected indexes in the best plan may be used as training instances in the first iteration for training the Index Cost Models. It has been observed that doing so reduces the amount of training instances required for many templates by about 5% to 8%.

The table of FIG. 4C summarizes the four workloads use in evaluating performance of the models described herein. Two of the workloads are standard benchmarks: TPC-H and TPC-DS; DSB and a real customer workload Real-M are also used. Both DSB and Real-M are more complex compared to TPC-H and TPC-DS and have skewed data distributions.

The following methods were compared: (1) a greedy algorithm and making optimizer calls for every query-configuration pair explored during enumeration (an ideal scenario for the maximum performance improvement), (2) the Database Tuning Advisor (DTA) tool, a state-of-the-art index tuning tool that uses a greedy algorithm for enumeration as in 1) along with several optimizations for reducing optimizer calls such as cost derivation using atomic configurations, workload compression, and index merging, (3) Index Filter for filtering syntactically-relevant indexes as discussed above but making optimizer calls during enumeration as in 1), (4) Index Cost Model trained in-situ during tuning using optimizer calls and then used for costing query-configuration pairs during enumeration, (5) using both the Index Filter and Index Cost Models. Unless otherwise specified, Random Forest (RF) models with 40 trees having a maximum depth of 10 is used for the Index Filter. To demonstrate the generalizability of Index Filter, the workload that used during training was excluded so that only the other three workloads are used for training. A RF model with 5 trees with a maximum depth of 6 is used for learning Index Cost Models. The default max configuration size (k) is set to 20.

The following two metrics are used: (1) Improvement (%): If C(W) is the original optimizer estimated cost of the workload without indexes and $C_k(W)$ is the optimizer estimated cost of the workload (when using recommended indexes), improvement (%) of W is measured as $$\frac{C(W)-Ck(W)}{C(W)} \times 100\%,$$

and (2) Time (in minutes) for tuning the workload.

Figure 7A:
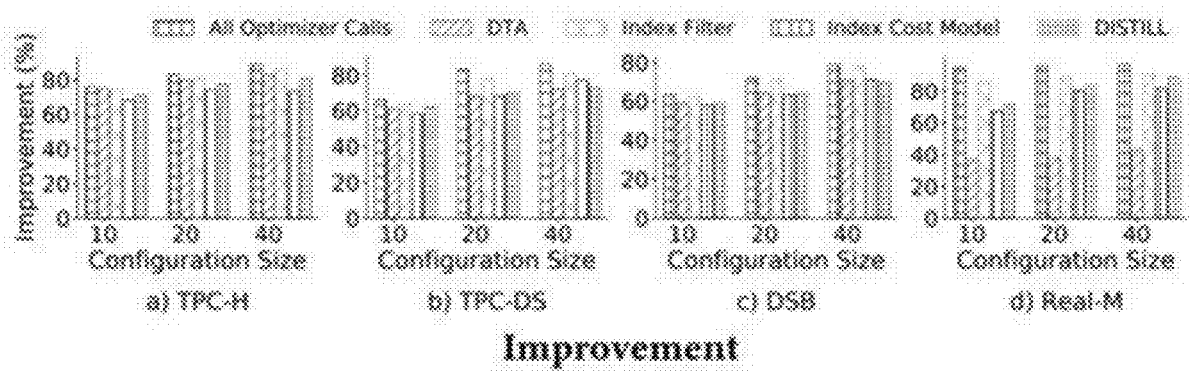
FIGS. 7A and 7B depict graphs showing the impact of compared methods on the improvement and the efficiency of index tuning, respectively.
Figure 7B:
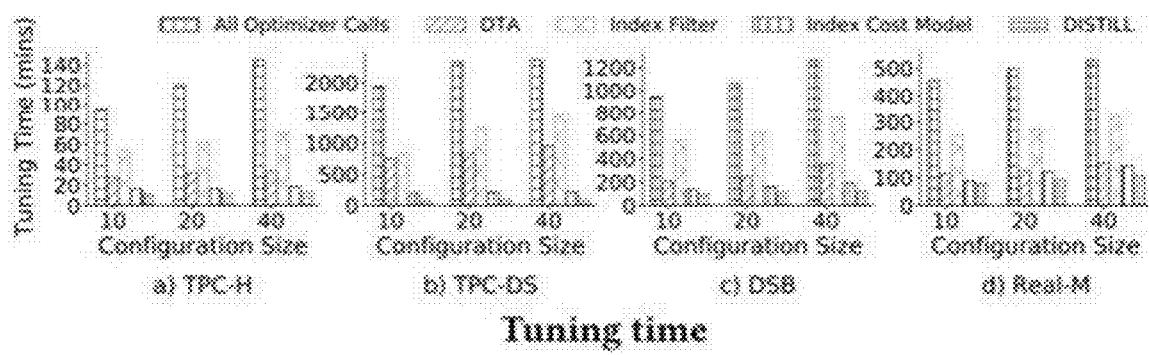

FIGS. 7A and 7B depict the impact of compared methods on the improvement and efficiency of index tuning, respectively. The tuning time for Index Cost Models and DISTILL (i.e., including both Index Cost Models and Index Filter) includes the training time of Index Cost Models. The table of FIG. 9A provides more details on the number of configurations explored, the reduction in optimizer calls, as well the inference overhead. Observe that the techniques described herein can return recommended indexes with similar quality to those of all optimizer calls (i.e., the ideal scenario) as well as DTA in 5 times to 15 times less time than all optimizer calls and 2 times to 12× less time than DTA. Index Filter achieves the highest improvement among the proposed techniques but takes significantly longer time compared to Index Cost Models. This is because Index Filter only removes the syntactic indexes that do not result in significant (>5%) improvement while using optimizer calls for all explored configurations during enumeration. Index Cost Models significantly improve the tuning time by making 15 times to 20 times fewer optimizer calls compared to all optimizer calls. Furthermore, observe that while there is a drop in improvement due to error in estimates, the difference is significantly small compared to DTA or all optimizer calls. When using both Index Filter and Index Cost Model (i.e., DISTILL), the improvement goes higher and the tuning time goes down, indicating the benefit of using them together. The Index Filter helps remove the spurious indexes, which in turn improves the quality of training samples for the Index Cost Models, making them converge faster with fewer training samples. Furthermore, the Index Filter also decreases the number of configurations to be evaluated by the Index Cost Models.

Figure 7C:
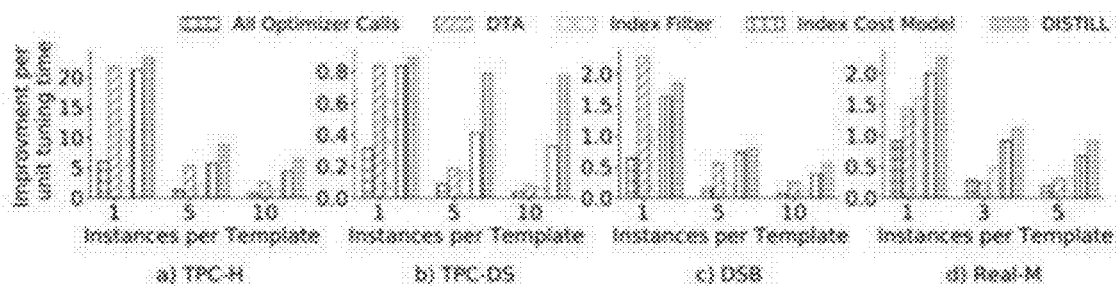
FIG. 7C depicts a graph showing the impact of the number of instances per template.

The impact of increasing the number of instances (while keeping the number of templates fixed) is also evaluated as shown in FIG. 7C. Due to space constraints, the results are depicted using improvement per unit time. As the number of instances increases, the performance of Index Cost Model improves, while for the baselines and the Index Filter, the relative performance is less variant to the number of instances. When the number of instances is 1, i.e., each query with a different query template, training Index Cost Models consumes a substantial fraction of the tuning time, and hence the difference between Index Cost Models and DTA is not significant. However, by only increasing the number of query instances to only 3, it can be seen that Index Cost Models perform much better.

To the effectiveness of ML algorithms, different ML algorithms were implemented as Index Filter as depicted in FIG. 8. The model is tested over one workload at a time, while using the other three workloads for training. The following regression models are considered: Logistic regression (LR), three tree-based ensemble models: Light GBM (LGBM), XGBoost, and Random Forest (RF) with hyper-parameters tuned using FLAML. The optimal number of trees varies between 30 and 60 with depth of trees between 5 to 20. In general, it was observed that RF with 40 trees and a depth of 10 results in best performance for most of the workloads. A feed-forward fully connected neural network implemented using MLPRegressor was also considered. The parameters were manually tuned and it was found that 3 hidden layers with ReLU as the activation function, adam as optimizer using a maximum of 300 epochs results in the best performance. For all models, log-transformed labels and mean square error were used as the loss function. The value of 0.05 was used as the threshold for identifying spurious indexes, and the F1 score for evaluation which captures both the precision and recall of identifying spurious indexes.

Figure 8A:
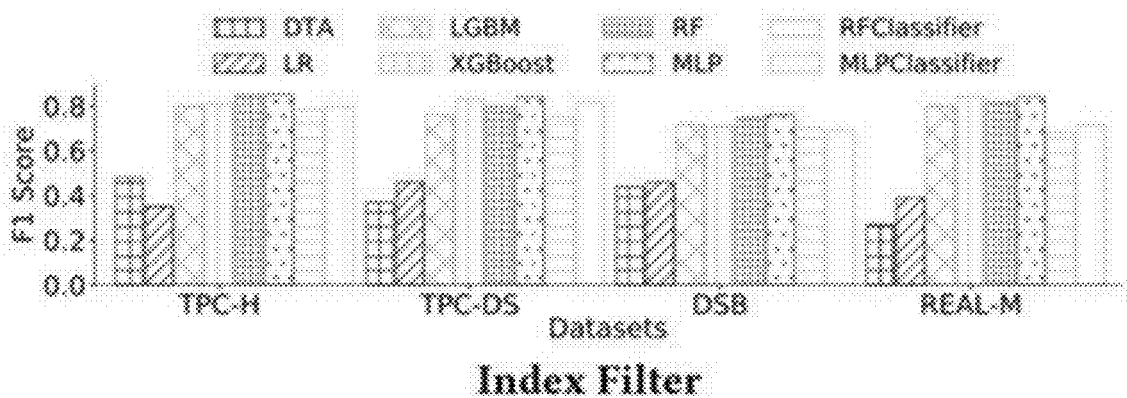
FIGS. 8A-8C depict graphs evaluating the effectiveness of different ML algorithms for Index Filter, Index Cost Model, and Index Filter regression model for costing, respectively.

As depicted in FIG. 8A, it was observed that most of the tree-based ensemble models perform significantly better than the default approach of generating syntactically-relevant indexes as in DTA. On the other hand, it was found that LR performs worse among all the ML techniques. On average, it was observed that tree-based models have a precision of about 0.75 and a recall of 0.85 across all the workloads. Furthermore, the worst precision and recall occur over the DSB benchmark (a more complex workload), with the highest values among all models as 0.71 and 0.79, whereas the best precision and recall happen for the TPC-H workload with the values of 0.78 and 0.95 respectively. On average, the false positive rate was able to be reduced by 70% with a low false negative rate between 4% and 14%, and an overall reduction of about 42% of the syntactic indexes from enumeration using the tree-based ensemble models.

Consideration was also given to learning the Index Filter as a classification task where all training instances where improvement fraction >0.05 are labeled as 1 and those with improvement fraction <0.05 are labeled as 0. Only the RF- and MLP-based classifiers are shown in FIG. 8A as performance of other classifiers are worse. It was found that learning the model as classifier results in lower F1 score compared to the regression models. This is because the regression model is able to better model how changes in feature values impact the cost, while with the binary labeling, this information is lost.

On average, it takes between 80 and 130 hours to generate the labelled training data (requiring optimizer calls) using the databases and workloads listed in the table of FIG. 4C, consisting of a maximum of 170 k (query, configuration) pairs and their optimizer estimated costs. The training takes less than 5 minutes for the tree-based ensemble models and about 20 minutes for neural network models using CPU. The inference time for tree-based ensemble models is about 10 ms (significantly faster than optimizer calls) while for MLP-based models it is in order of 100 of milliseconds.

Figure 8B:
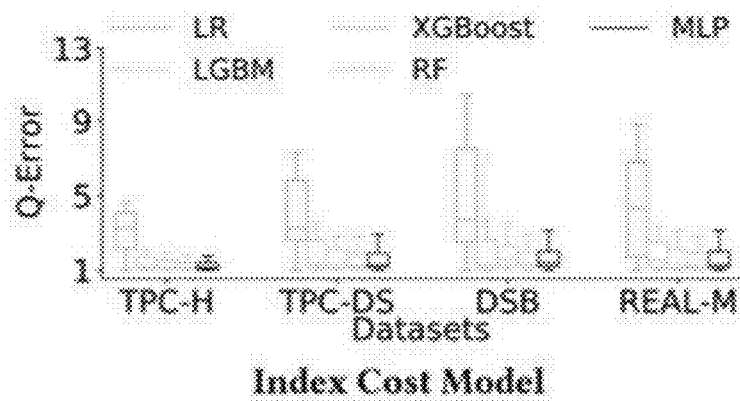

For the Index Cost Models, considered the same ML algorithms as above were considered as depicted in FIG. 8B. For the neural network model, the same settings were used as for the Index Filter except that only 100 epochs are used for training and using 2 hidden layers instead of 3 as adding more epochs and layers results in a significant increase in tuning time without much improvement in accuracy. For this experiment, a 5-fold cross-validation with a training size set to 25% of the query-candidate index pairs was performed. Again, it was observed that tree-based models perform significantly better than the LR model. On average, the median q-error of tree-based models across all workloads is around 1.18. For tree-based models, reasonably good performance can be achieved using between 4 to 10 trees with depth of trees ranging between 3 to 8.

The training time of Index Cost Models varies between 20 seconds to 100 seconds depending on the number of optimizer calls. On average, about 35 optimizer calls were required to train a model for each template. The training of ML model given the labelled instances typically takes less than 5 seconds. Each inference call takes less than 5 milliseconds, including the inter-process communication. This is significantly faster than an optimizer call, which take several 100s of milliseconds.

The Index Filter uses four types of signals as features: (1) utility, (2) shape, (3) operators, and (4) optimizer behavior captured via table and index details. Each feature was turned off one at a time and tested the F1 score of the Index Filter. For this experiment, RF was used as the choice of ML model. The table of FIG. 9B shows the results. It can be seen that utility has the maximum influence on the F1 score, the removal of which results in the maximum decrease in the F1 score. This is followed by shape-based and operator-based features. Finally, the optimizer behavior captured via table and index details were shown to have the minimum impact on the F1 score.

Standalone comparisons were performed between Index Cost Model and cost derivation using atomic configurations using the same set of input indexes. The table of FIG. 9C shows the results for cost-derivation over different workloads. Note that cost derivation works only with the greedy algorithm while Index Cost Model is agnostic of the enumeration algorithm. Despite this, it can be seen that cost derivation makes between 2 times and 6 times more optimizer calls and takes proportionally more tuning time compared to Index Cost Models (see FIGS. 7A and 7B) while giving significantly worse improvement over complex workloads such a Real-M. Furthermore, cost derivation takes much more time than DTA. This is because DTA in addition to cost derivation also leverages other optimizations such as compression, index merging, table-subset selections which reduces the search space.

Figure 8C:
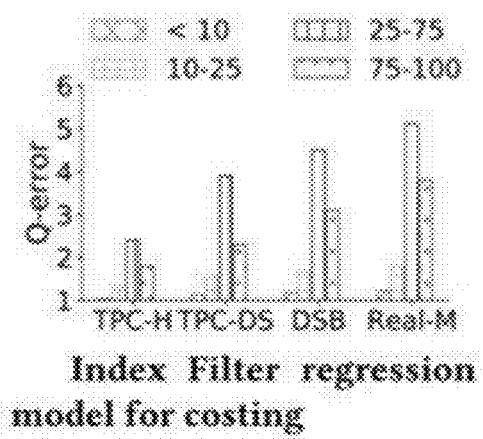

To understand why a regression model cannot be used for costing, query-configuration pairs were grouped into four groups based on their actual improvements. As depicted in FIG. 8c, Index Filter is effective at identifying configurations with small improvements in performance (e.g., <5% improvement) as depicted via a low q-error. However, for configurations which result in significant improvement, Index Filter suffers with large q-errors, with significantly worse performance than the workload-specific Index Cost Models.

Figure 10A:
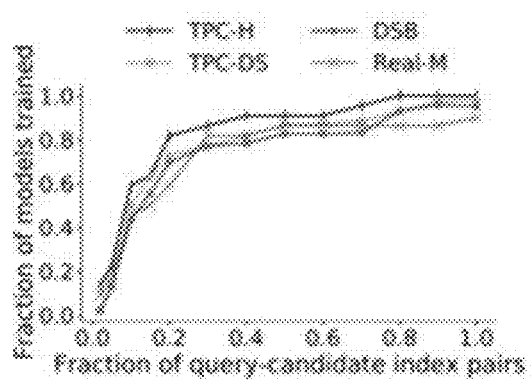
FIGS. 10A-10E depict graphs showing the sensitivity of parameters used in iterative training.

FIG. 10A depicts the percentage of query templates trained for each workload, as the training size is varied as a fraction of the total query-candidate index pairs of a template. A model is trained when the geometric mean of q-error on validation set is <1.20. On average, with training size around 0.20 fraction, about 65% of the models were capable of being trained across all workloads. With an additional 20% of training instances, over 85% of the models were able to be trained, after which adding more training samples has marginal impact on reducing the error of the models.

Figure 10B:
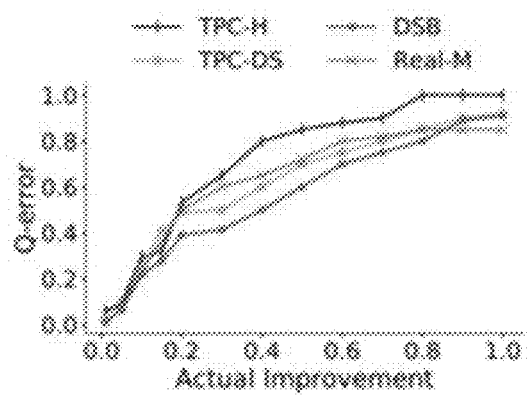

FIGS. 10A and 10B show the impact of clustering of queries as well as indexes on the training size required to train models. As in the above experiment, a model is trained if the geometric mean of q-error over the validation set is below 1.20. As shown, a large number of models were able to be trained with fewer training instances by clustering. For instances, with 0.20 training fraction, about 65% of the models (on average across workloads) were able to be trained with clustering. Only 40% of models were able to be trained without clustering.

Figure 10C:
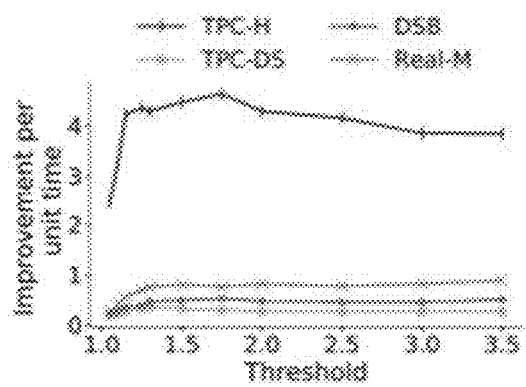

FIG. 10C depicts the impact of error threshold (measured using geometric mean of q-error) used for training the cost model on the improvement and the end-to-end tuning time captured via improvement per unit tuning time. Observe that when the error threshold is set to close to 1.0, the improvement is very close to the improvement provided by making all optimizer calls. However, the tuning time is also high— about 2 times to 3 times more than the tuning time it takes for the default value 1.20. As the error threshold is increased from 1.05 to 1.50, a drastic reduction (3-5 times) in tuning time is seen with an average reduction of 8% in the improvement across all workloads. On further relaxing the error threshold, a faster reduction in improvement is also seen due to less accurate cost models. Overall, a threshold between 1.20 and 1.50 results in much faster tuning with small reduction in quality of indexes, compared to making all optimizer calls.

Figure 10D:
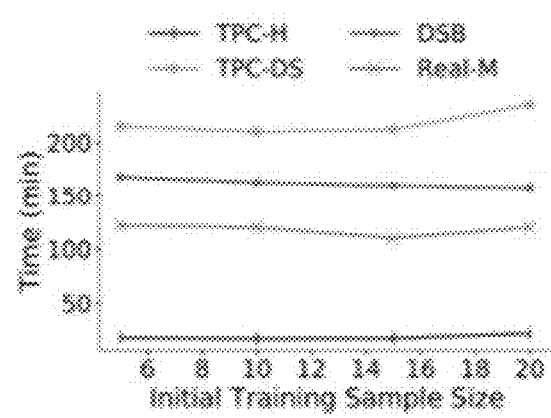
Figure 10E:
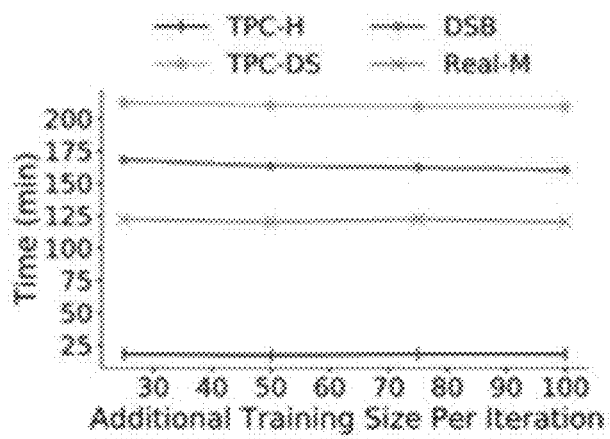

FIGS. 10D and 10E show the impact on tuning time as the threshold $\alpha$ (initial training size) and (additional training size) added per iteration for incrementally training cost models is varied. On average, as depicted in FIG. 10A, 30% to 50% of the total query-candidate index pairs is helpful in training most of the cost models. Thus, the choices of a and determine the number of times needed to train the models. Overall, different values of a and in a range of 5% to 15% give similar results in tuning time with the number of iterations ranging between 2 to 5.

After selecting each index during greed enumeration, using the Index Filter to prune out candidate indexes that are less likely to result in improvement of cost was evaluated. It was found that doing so results in between 10% and 15% decrease in tuning time across workloads with a small reduction (<3%) in quality as seen FIG. 11A. During the first iteration while training Index Cost Models, adding seed indexes as training samples was evaluated. As depicted in FIG. 11B, doing so results in faster convergence of cost models as compared to FIG. 10A. For instance, about 18% of Index Cost Models on TPC-DS workload can be learned when using seed indexes compared to 10% of models with the same fraction of training samples but not using seed indexes.

Figure 11A:
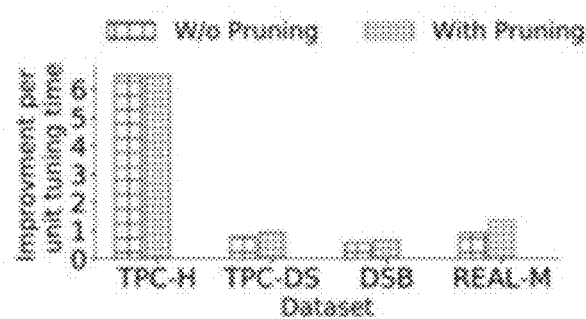
FIG. 11A depicts a graph showing the improvement in tuning time due to pruning after selecting each index using greedy search algorithm.
Figure 11B:
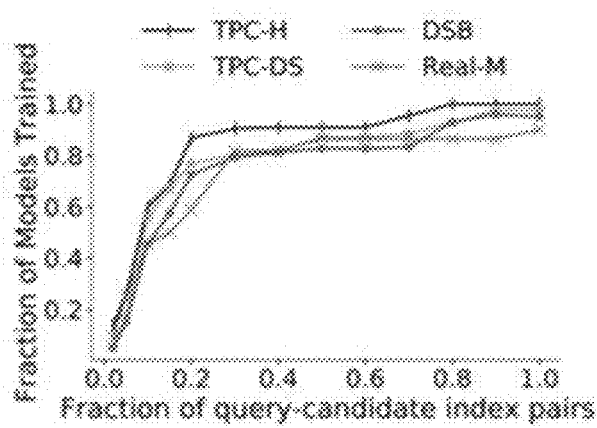
FIG. 11B depicts a graph showing the impact of using seed indexes in training Index Cost Models.

FIGS. 11A and 11B depict the impact of optimizations proposed in § 5.3. FIG. 11A shows the improvement in tuning time resulting from pruning after selecting each index during greedy selection (based on testing using the workloads from the table of FIG. 4C). After selecting each index during greed enumeration, the Index Filter is used to prune out candidate indexes that are less likely to result in improvement of cost. It was found that doing so results in between 10% and 15% decrease in tuning time across workloads with a small reduction (<3%) in quality. FIG. 11B shows the impact of using seed indexes in training the Index Cost Models. During the first iteration while training Index Cost Models, seed indexes were added as training samples. It was observed that doing so results in faster convergence of cost models as compared to FIG. 10A. For instance, about 18% of Index Cost Models on TPC-DS workload were learned when using seed indexes compared to 10% of models with the same fraction of training samples but not using seed indexes.

The detailed examples of systems, devices, and techniques described in connection with FIGS. 1-11 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-11 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 12:
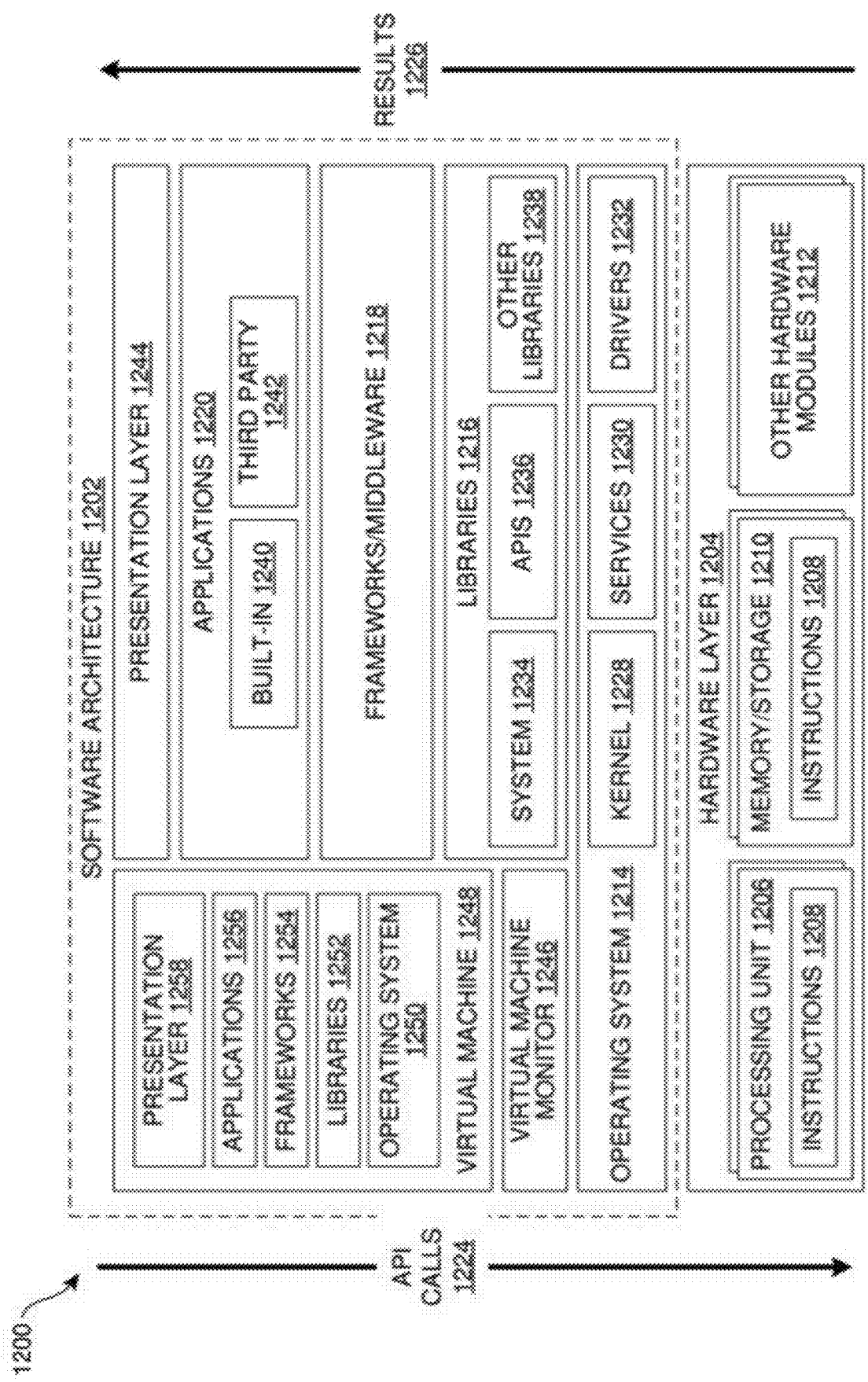
FIG. 12 is a block diagram of an example computing device, which may be used to provide implementations of the mechanisms described herein.

FIG. 12 is a block diagram 1200 illustrating an example software architecture 1202, various portions of which may be used in conjunction with various hardware architectures herein described, which may implement any of the above-described features. FIG. 12 is a non-limiting example of a software architecture and it will be appreciated that many other architectures may be implemented to facilitate the functionality described herein. The software architecture 1202 may execute on hardware that include, among other things, document storage, processors, memory, and input/output (I/O) components. A representative hardware layer 1204 is illustrated and can represent, for example, the devices described herein. The representative hardware layer 1204 includes a processing unit 1206 and associated executable instructions 1208. The executable instructions 1208 represent executable instructions of the software architecture 1202, including implementation of the methods, modules and so forth described herein. The hardware layer 1204 also includes a memory/storage 1210, which also includes the executable instructions 1208 and accompanying data. The hardware layer 1204 may also include other hardware modules 1212. Instructions 1208 held by processing unit 1206 may be portions of instructions 1208 held by the memory/storage 1210.

The example software architecture 1202 may be conceptualized as layers, each providing various functionality. For example, the software architecture 1202 may include layers and components such as an operating system (OS) 1214, libraries 1216, frameworks 1218, applications 1220, and a presentation layer 1244. Operationally, the applications 1220 and/or other components within the layers may invoke API calls 1224 to other layers and receive corresponding results 1226. The layers illustrated are representative in nature and other software architectures may include additional or different layers. For example, some mobile or special purpose operating systems may not provide the frameworks/middleware 1218.

The OS 1214 may manage hardware resources and provide common services. The OS 1214 may include, for example, a kernel 1228, services 1230, and drivers 1232. The kernel 1228 may act as an abstraction layer between the hardware layer 1204 and other software layers. For example, the kernel 1228 may be responsible for memory management, processor management (for example, scheduling), component management, networking, security settings, and so on. The services 1230 may provide other common services for the other software layers. The drivers 1232 may be responsible for controlling or interfacing with the underlying hardware layer 1204. For instance, the drivers 1232 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1216 may provide a common infrastructure that may be used by the applications 1220 and/or other components and/or layers. The libraries 1216 typically provide functionality for use by other software modules to perform tasks, rather than rather than interacting directly with the OS 1214. The libraries 1216 may include system libraries 1234 (for example, C standard library) that may provide functions such as memory allocation, string manipulation, file operations. In addition, the libraries 1216 may include API libraries 1236 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1216 may also include a wide variety of other libraries 1238 to provide many functions for applications 1220 and other software modules.

The frameworks 1218 (also sometimes referred to as middleware) provide a higher-level common infrastructure that may be used by the applications 1220 and/or other software modules. For example, the frameworks 1218 may provide various graphic user interface (GUI) functions, high-level resource management, or high-level location services. The frameworks 1218 may provide a broad spectrum of other APIs for applications 1220 and/or other software modules.

The applications 1220 include built-in applications 1240 and/or third-party applications 1242. Examples of built-in applications 1240 may include, but are not limited to, a contacts application, a browser application, a location application, a media application, a messaging application, and/or a game application. Third-party applications 1242 may include any applications developed by an entity other than the vendor of the particular platform. The applications 1220 may use functions available via OS 1214, libraries 1216, frameworks 1218, and presentation layer 1244 to create user interfaces to interact with users.

Some software architectures use virtual machines, as illustrated by a virtual machine 1248. The virtual machine 1248 provides an execution environment where applications/modules can execute as if they were executing on a hardware machine. The virtual machine 1248 may be hosted by a host OS (for example, OS 1214) or hypervisor, and may have a virtual machine monitor 1246 which manages operation of the virtual machine 1248 and interoperation with the host operating system. A software architecture, which may be different from software architecture 1202 outside of the virtual machine, executes within the virtual machine 1248 such as an OS 1250, libraries 1252, frameworks 1254, applications 1256, and/or a presentation layer 1258.

Figure 13:
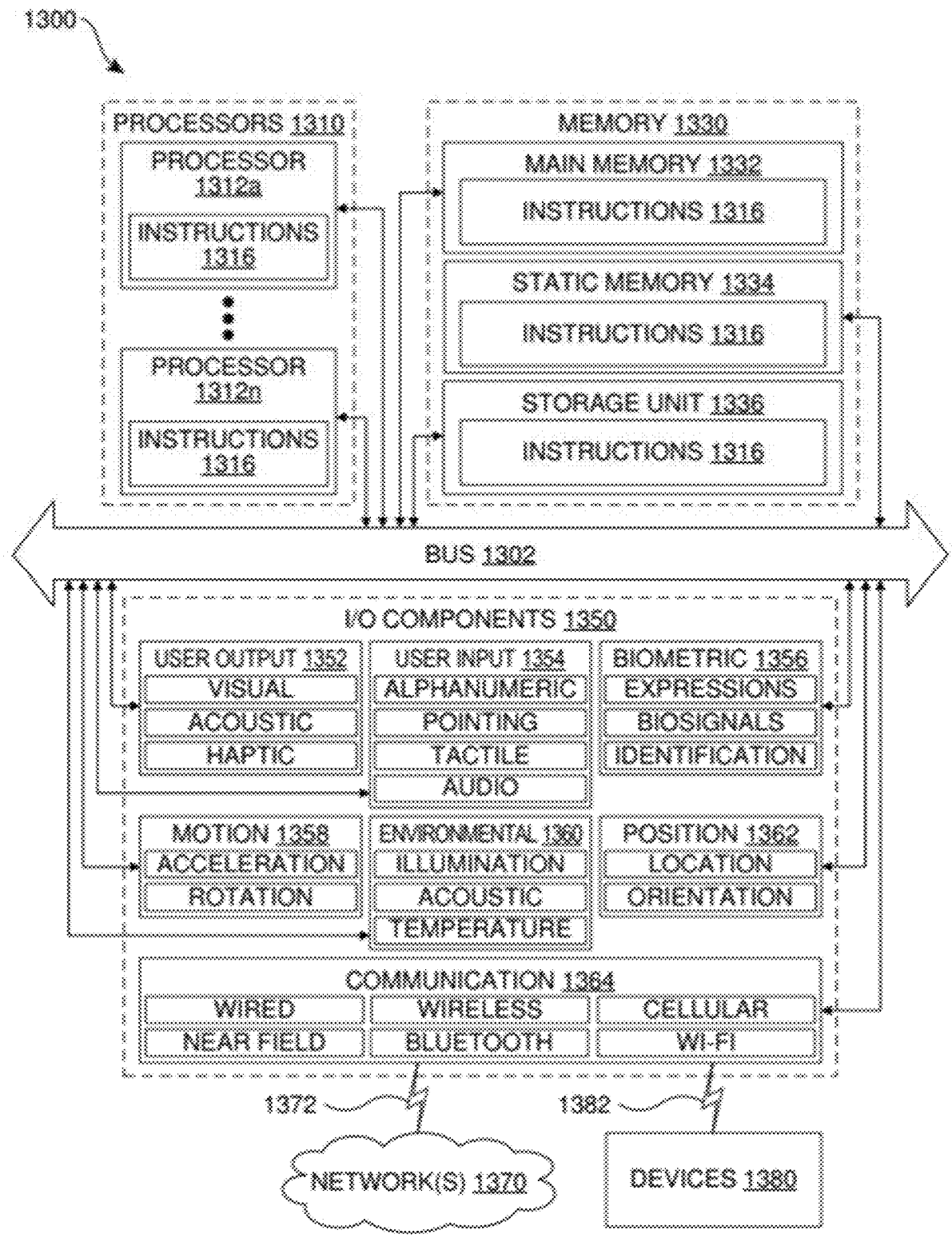
FIG. 13 is a block diagram illustrating components of an example machine configured to read instructions from a machine-readable medium.

FIG. 13 is a block diagram illustrating components of an example machine 1300 configured to read instructions from a machine-readable medium (for example, a machine-readable storage medium) and perform any of the features described herein. The example machine 1300 is in a form of a computer system, within which instructions 1316 (for example, in the form of software components) for causing the machine 1300 to perform any of the features described herein may be executed. As such, the instructions 1316 may be used to implement modules or components described herein. The instructions 1316 cause unprogrammed and/or unconfigured machine 1300 to operate as a particular machine configured to carry out the described features. The machine 1300 may be configured to operate as a standalone device or may be coupled (for example, networked) to other machines. In a networked deployment, the machine 1300 may operate in the capacity of a server machine or a client machine in a server-client network environment, or as a node in a peer-to-peer or distributed network environment. Machine 1300 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1300 is illustrated, the term "machine" includes a collection of machines that individually or jointly execute the instructions 1316.

The machine 1300 may include processors 1310, memory 1330, and I/O components 1350, which may be communicatively coupled via, for example, a bus 1302. The bus 1302 may include multiple buses coupling various elements of machine 1300 via various bus technologies and protocols. In an example, the processors 1310 (including, for example, a central processing unit (CPU), a graphics processing unit (GPU), a digital signal processor (DSP), an ASIC, or a suitable combination thereof) may include one or more processors 1312a to 1312n that may execute the instructions 1316 and process data. In some examples, one or more processors 1310 may execute instructions provided or identified by one or more other processors 1310. The term "processor" includes a multi-core processor including cores that may execute instructions contemporaneously. Although FIG. 13 shows multiple processors, the machine 1300 may include a single processor with a single core, a single processor with multiple cores (for example, a multi-core processor), multiple processors each with a single core, multiple processors each with multiple cores, or any combination thereof. In some examples, the machine 1300 may include multiple processors distributed among multiple machines.

The memory/storage 1330 may include a main memory 1332, a static memory 1334, or other memory, and a storage unit 1336, both accessible to the processors 1310 such as via the bus 1302. The storage unit 1336 and memory 1332, 1334 store instructions 1316 embodying any one or more of the functions described herein. The memory/storage 1330 may also store temporary, intermediate, and/or long-term data for processors 1310. The instructions 1316 may also reside, completely or partially, within the memory 1332, 1334, within the storage unit 1336, within at least one of the processors 1310 (for example, within a command buffer or cache memory), within memory at least one of I/O components 1350, or any suitable combination thereof, during execution thereof. Accordingly, the memory 1332, 1334, the storage unit 1336, memory in processors 1310, and memory in I/O components 1350 are examples of machine-readable media.

As used herein, "machine-readable medium" refers to a device able to temporarily or permanently store instructions and data that cause machine 1300 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1316) for execution by a machine 1300 such that the instructions, when executed by one or more processors 1310 of the machine 1300, cause the machine 1300 to perform and one or more of the features described herein. Accordingly, a "machine-readable medium" may refer to a single storage device, as well as "cloud-based" storage systems or storage networks that include multiple storage apparatus or devices.

The I/O components 1350 may include a wide variety of hardware components adapted to receive input, provide output, produce output, transmit information, exchange information, capture measurements, and so on. The specific I/O components 1350 included in a particular machine will depend on the type and/or function of the machine. For example, mobile devices such as mobile phones may include a touch input device, whereas a headless server or IoT device may not include such a touch input device. The particular examples of I/O components illustrated in FIG. 13 are in no way limiting, and other types of components may be included in machine 1300. The grouping of I/O components 1350 are merely for simplifying this discussion, and the grouping is in no way limiting. In various examples, the I/O components 1350 may include user output components 1352 and user input components 1354. User output components 1352 may include, for example, display components for displaying information (for example, a liquid crystal display (LCD) or a projector), acoustic components (for example, speakers), haptic components (for example, a vibratory motor or force-feedback device), and/or other signal generators. User input components 1354 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1350 may include biometric components 1356 and/or position components 1362, among a wide array of other environmental sensor components. The biometric components 1356 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1362 may include, for example, location sensors (for example, a Global Position System (GPS) receiver), altitude sensors (for example, an air pressure sensor from which altitude may be derived), and/or orientation sensors (for example, magnetometers).

The I/O components 1350 may include communication components 1364, implementing a wide variety of technologies operable to couple the machine 1300 to network(s) 1370 and/or device(s) 1380 via respective communicative couplings 1372 and 1382. The communication components 1364 may include one or more network interface components or other suitable devices to interface with the network(s) 1370. The communication components 1364 may include, for example, components adapted to provide wired communication, wireless communication, cellular communication, Near Field Communication (NFC), Bluetooth communication, Wi-Fi, and/or communication via other modalities. The device(s) 1380 may include other machines or various peripheral devices (for example, coupled via USB).

In some examples, the communication components 1364 may detect identifiers or include components adapted to detect identifiers. For example, the communication components 1364 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1364 such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1. A method of training an index filter for an index tuning system, the method comprising:
  receiving a plurality of different workloads and a plurality of different databases, each database including different tables and each workload including a plurality of queries;
  generating labeled training by making optimizer calls to a query optimizer of a database using query and index configuration pairs from the plurality of databases and the plurality of workloads using an index tuning system;
  training an index filter model to identify signals in the labeled training data, the signals being indicative of a potential performance improvement associated with using an index configuration for a given query;
  training the index filter model to learn rules over the signals for identifying spurious indexes; and
  storing the index filter model in a memory.

Item 2. The method of item 1, wherein the index filter model is a workload-agnostic filtering model.

Item 3. The method of items 1-2, wherein the index filter model is trained offline.

Item 4. The method of any of items 1-3, wherein the signals indicate whether or not an index is going to be used within a query.

Item 5. The method of any of items 1-4, wherein training the index filter model to capture the signals includes:
  identifying an original execution plan for a query using the query optimizer using the index tuning system;
  traversing the original execution plan from bottom to top to identify any physical operators whose cost can be reduced if an index is used with the original execution plan using the index tuning system;
  determining an estimated cost reduction for each of the identified physical operators;
  summing the cost reductions of the identified physical operators to determine a total cost reduction for the use of the index; and
  determining a utility for the index by normalizing the total cost reduction for the index using a total cost of the original plan.

Item 6. The method of any of items 1-5, wherein identifying the physical operators whose cost can be reduced includes:
  identifying indexes that satisfy a filtering property such that the indexes enable access of one or more tuples to be skipped during scan, filter, or join operations.

Item 7. The method of any of items 1-6, wherein a cost reduction for any physical operators associated with the filtering property is based on the average selectivity of key columns in the index that are used by the operator.

Item 8. The method of any of items 1-5, wherein identifying the physical operators whose cost can be reduced includes:
  identifying indexes that satisfy an interesting order property such that key columns of an index are sorted according to a tuple ordering specified by columns in a query's join, group-by, or order by clause.

Item 9. The method of any of items 1-8, wherein, when an index is sorted in an interesting order specified by an operator, a cost reduction for the operator corresponds to a cost of the operator.

Item 10. A database management system comprising:
  a processor; and
  a memory in communication with the processor, the memory comprising executable instructions that, when executed by the processor, cause the data processing system to perform functions of:
  receiving a workload including a plurality of queries to be run against a database;
  identifying syntactically relevant indexes based on the queries in the workload using an index tuning system;
  making optimizer calls to a query optimizer of a database with a database management system (DBMS) using query and index configuration pairs to estimate costs for the query and index configuration pairs as part of an index tuning process;
  identifying queries having a same template using the index tuning system;
  selecting a set of the query and index configuration pairs to use as training instances;
  training an index cost model for the group using the training instances while the index tuning process is being performed, the index cost model being trained to estimate a cost for the queries having the same template; and once a target accuracy for the index cost model has been achieved, using the index cost model to estimate costs for the queries having the same template as part of the index tuning process without having to make optimizer calls.

Item 11. The database management system of item 10, wherein training the index cost model includes making a pass on all the queries having the same template to identify features of the template.

Item 12. The database management system of any of items 10-11, wherein the index cost model is trained iteratively by incrementally increasing a number of training instances used in each iteration until the target accuracy is achieved.

Item 13. The database management system of any of items 10-12, wherein the index cost model is a random forest model.

Item 14. A method comprising:
  receiving a workload including a plurality of queries to be run against a database;
  identifying syntactically relevant indexes using the queries in the workload;
  filtering the syntactically relevant indexes using an index filter model, the index filter model being a workload-agnostic filtering model trained to identify signals in query-configuration pairs based on the syntactically relevant indexes and to apply rules to the identified signals to detect spurious indexes;
  making optimizer calls using query-configuration pairs based on the filtered syntactically relevant indexes to estimate costs for the query-configuration pairs based on the filtered syntactically relevant index models as part of an index tuning process;
  identifying queries from the filtered syntactically relevant index models having a same template;
  selecting a diverse set of the query-configuration pairs to use as training instances from the query-configuration pairs based on the filtered syntactically relevant index models;
  training an index cost model for the group using the training instances while the index tuning process is being performed, the index cost model being trained to estimate a cost for the queries having the same template; and
  once a target accuracy for the index cost model has been achieved, using the index cost model to estimate costs for the query-configuration pairs based on the filtered syntactically relevant index models without having to make optimizer calls.

Item 15. The method of item 14, wherein the identifying the signals includes:
  identifying an original execution plan for a query of a database using a database management system (DBMS) of the database;
  traversing the original execution plan from bottom to top to identify any physical operators whose cost can be reduced if an index is used with the original execution plan;
  determining an estimated cost reduction for each of the identified physical operators;
  summing the cost reductions of the identified physical operators to determine a total cost reduction for the use of the index; and
  determining a utility for the index by normalizing the total cost reduction for the index using a total cost of the original plan.

Item 16. The method of any of items 14-15, wherein identifying the physical operators whose cost can be reduced includes:
  identifying indexes that satisfy a filtering property such that the indexes enable access of one or more tuples to be skipped during scan, filter, or join operations.

Item 17. The method of any of items 14-16, wherein identifying the physical operators whose cost can be reduced includes:
  identifying indexes that satisfy an interesting order property such that key columns of an index are sorted according to a tuple ordering specified by columns in a query's join, group-by, or order by clause.

Item 18. The method of any of items 14-17, wherein the index cost model is trained iteratively by incrementally increasing a number of training instances used in each iteration until the target accuracy is achieved.

Item 19. The method of any of items 14-17, wherein the index filter model is a workload-agnostic filtering model.

Item 20. The method of any of items 14-17, wherein the index filter model is trained offline.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method for providing index filtering for an index tuning system, the method comprising:
   receiving a plurality of different workloads and a plurality of different databases, each database including different tables and each workload including a plurality of queries;
   generating labeled training data by making optimizer calls to a query optimizer of a database using query and index configuration pairs from the plurality of databases and the plurality of workloads using the index tuning system;
   training an index filter model to identify signals in the labeled training data, the signals being indicative of a potential performance improvement associated with using an index configuration for a given query;
   learning rules based on the signals for identifying spurious indexes using the index filter model which enable the index filter model to identify the spurious indexes without having to make optimizer calls;
   storing the index filter model in a memory;
   using the index filter model to identify spurious indexes in a group of syntactically relevant indexes which have been selected for a workload without making optimizer calls to evaluate the group of syntactically relevant indexes; and
   removing the identified spurious indexes from the group of syntactically relevant indexes so the spurious indexes are not used in index configurations during an index tuning process.

2. The method of claim 1, wherein the index filter model is a workload-agnostic filtering model, and wherein the identified spurious indexes are removed before the index tuning process makes optimizer calls to identify an index configuration to recommend to the query optimizer.

3. The method of claim 1, wherein the index filter model is trained offline.

4. The method of claim 1, wherein the signals indicate whether or not an index is going to be used within a query.

5. The method of claim 4, wherein training the index filter model to capture the signals includes:
   identifying an original execution plan for the query using the query optimizer;
   traversing the original execution plan from bottom to top to identify any physical operators whose cost can be reduced if an index is used with the original execution plan using the index tuning system;
   determining an estimated cost reduction for each of the identified physical operators;
   summing the estimated cost reductions of the identified physical operators to determine a total cost reduction for use of the index; and
   determining a utility for the index by normalizing the total cost reduction for the index using a total cost of the original plan.

6. The method of claim 5, wherein identifying the physical operators whose cost can be reduced includes:
   identifying indexes that satisfy a filtering property such that the indexes enable access of one or more tuples to be skipped during scan, filter, or join operations.

7. The method of claim 6, wherein a cost reduction for any physical operator associated with the filtering property is based on an average selectivity of key columns in the index that are used by the physical operator.

8. The method of claim 5, wherein identifying the physical operators whose cost can be reduced includes:
   identifying indexes that satisfy an interesting order property such that key columns of an index are sorted according to a tuple ordering specified by columns in a query's join, group-by, or order by clause.

9. The method of claim 8, wherein, when an index is sorted in an interesting order specified by an operator, a cost reduction for the operator corresponds to a cost of the operator.

10. A database management system comprising:
    a processor; and
    a memory in communication with the processor, the memory comprising executable instructions that, when executed by the processor, cause the database management system to perform functions of:
    receiving a workload including a plurality of queries to be run against a database;
    identifying syntactically relevant indexes based on the queries in the workload using an index tuning system;
    making optimizer calls to a query optimizer of a database with a database management system (DBMS) using query and index configuration pairs to estimate costs for the query and index configuration pairs as part of an index tuning process;
    identifying queries having a same template using the index tuning system;
    selecting a set of the query and index configuration pairs to use as training instances;

training an index cost model for the set using the training instances while the index tuning process is being performed, the index cost model being trained to estimate a cost for the queries having the same template;

once a target accuracy for the index cost model has been achieved, using the index cost model to estimate costs for the queries having the same template as part of the index tuning process without having to make optimizer calls;

using an index filter model to identify spurious indexes in the identified syntactically relevant indexes which have been selected for the workload; and removing the identified spurious indexes from the identified syntactically relevant indexes so the spurious indexes are not used in index configurations during the index tuning process.

11. The database management system of claim 10, wherein training the index cost model includes making a pass on all the queries having the same template to identify features of the template, and wherein the identified spurious indexes are removed before the index tuning process makes optimizer calls to identify an index configuration to recommend to the query optimizer.

12. The database management system of claim 10, wherein the index cost model is trained iteratively by incrementally increasing a number of training instances used in each iteration until the target accuracy is achieved.

13. The database management system of claim 10, wherein the index cost model is a random forest model.

14. A method for tuning a database index, the method comprising:
receiving a workload including a plurality of queries to be run against a database;
identifying syntactically relevant indexes using the queries in the workload;
filtering the syntactically relevant indexes using an index filter model, the index filter model being a workload-agnostic filtering model trained to identify signals in query-configuration pairs based on the syntactically relevant indexes and to apply rules to the identified signals to detect spurious indexes;
making optimizer calls using query-configuration pairs based on the filtered syntactically relevant indexes to estimate costs for the query-configuration pairs based on the filtered syntactically relevant indexes as part of an index tuning process;
identifying queries from the filtered syntactically relevant indexes having a same template;
selecting a diverse set of the query-configuration pairs to use as training instances from the query-configuration pairs based on the filtered syntactically relevant indexes;
training an index cost model for the set using the training instances while the index tuning process is being performed, the index cost model being trained to estimate a cost for the queries having the same template;
once a target accuracy for the index cost model has been achieved, using the index cost model to estimate costs for the query-configuration pairs based on the filtered syntactically relevant index models without having to make optimizer calls;
using an index filter model to identify spurious indexes in the filtered syntactically relevant indexes which have been selected for the workload; and
removing the identified spurious indexes from the filtered syntactically relevant indexes so the spurious indexes are not used in index configurations during the index tuning process.

15. The method of claim 14, wherein identifying the signals includes:
identifying an original execution plan for a query of a database using a database management system (DBMS) of the database;
traversing the original execution plan from bottom to top to identify any physical operators whose cost can be reduced if an index is used with the original execution plan;
determining an estimated cost reduction for each of the identified physical operators;
summing the estimated cost reductions of the identified physical operators to determine a total cost reduction for use of the index; and
determining a utility for the index by normalizing the total cost reduction for the index using a total cost of the original plan.

16. The method of claim 15, wherein identifying the physical operators whose cost can be reduced includes:
identifying indexes that satisfy a filtering property such that the indexes enable access of one or more tuples to be skipped during scan, filter, or join operations.

17. The method of claim 15, wherein identifying the physical operators whose cost can be reduced includes:
identifying indexes that satisfy an interesting order property such that key columns of an index are sorted according to a tuple ordering specified by columns in a query's join, group-by, or order by clause.

18. The method of claim 14, wherein the index cost model is trained iteratively by incrementally increasing a number of training instances used in each iteration until the target accuracy is achieved.

19. The method of claim 14, wherein the index filter model is a workload-agnostic filtering model, and wherein the identified spurious indexes are removed before the index tuning process makes optimizer calls to identify an index configuration to recommend to the query optimizer.

20. The method of claim 14, wherein the index filter model is trained offline.

* * * * *